(12) United States Patent
Alberti et al.

(10) Patent No.: US 7,218,807 B2
(45) Date of Patent: May 15, 2007

(54) OPTICAL TRANSMISSION SYSTEM USING AN OPTICAL PHASE CONJUGATION DEVICE

(75) Inventors: Francesco Alberti, Turate (IT); Paolo Minzioni, Pavia (IT); Alessandro Schiffini, Milan (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/508,515

(22) PCT Filed: Mar. 22, 2002

(86) PCT No.: PCT/EP02/03251

§ 371 (c)(1),
(2), (4) Date: May 11, 2005

(87) PCT Pub. No.: WO03/081815

PCT Pub. Date: Oct. 2, 2003

(65) Prior Publication Data

US 2005/0220399 A1    Oct. 6, 2005

(51) Int. Cl.
G02B 6/26 (2006.01)
G02B 6/28 (2006.01)

(52) U.S. Cl. .......................... 385/27; 385/24
(58) Field of Classification Search ............... 385/27, 385/24; 398/147, 150
See application file for complete search history.

(56) References Cited

U.S. PATENT DOCUMENTS 5,365,362 A    11/1994  Gnauck et al.
5,798,853 A    8/1998   Watanabe
6,128,118 A *  10/2000  Marcenac ................... 398/147

(Continued)

FOREIGN PATENT DOCUMENTS

DE  196 22 010 A1   12/1997
EP      0703 680 A2   3/1996
EP    0 862 078 A1   9/1998

(Continued)

OTHER PUBLICATIONS

Agrawal, G. P., "Fiber-Optic Communication Systems", Second Edition, A Wiley-Interscience Publication, New York, pp. 448-450, (1997).

(Continued)

Primary Examiner—Sarah Song
(74) Attorney, Agent, or Firm—Finnegan, Henderson, Farabow, Garrett & Dunner, L.L.P.

(57) ABSTRACT

An optical system having an optical fiber path suitable for propagating an optical signal at least in a first direction, and a plurality M of optical amplifiers disposed along the optical fiber path so as to divide the optical fiber path in N spans of optical fiber. The spans of optical fiber all have substantially a length $L_{amp}$ and have at least one transmission optical fiber having an effective length $L_{eff}$. An optical phase conjugation device is associated to one of the amplifiers of the plurality of amplifiers and is disposed in combination with a dispersion compensator. The compensator is disposed upstream from the amplifier associated to the optical phase conjugation device and is adapted for introducing an accumulated dispersion such as to substantially compensate the dispersion accumulated in a portion having a length $(L_{amp}-L_{eff})$ of the span immediately upstream from the amplifier associated to the optical phase conjugation device.

13 Claims, 14 Drawing Sheets

U.S. PATENT DOCUMENTS

| | | |
|---|---|---|
| 6,175,435 B1 | 1/2001 | Watanabe |
| 6,304,348 B1 | 10/2001 | Watanabe |
| 2003/0118347 A1* | 6/2003 | Papaparaskeva et al. ... 398/147 |

FOREIGN PATENT DOCUMENTS

| | | |
|---|---|---|
| EP | 1 133 031 A2 | 9/2001 |
| WO | WO 99/05805 | 2/1999 |

OTHER PUBLICATIONS

Lorattanasane, C. et al., "Design Theory of Long-Distance Optical Transmission Systems Using Midway Optical Phase Conjugation", Journal of Lightwave Technology, vol. 15, No. 6, pp. 948-955, (Jun. 1997).

Agrawal, G.P., "Nonlinear Fiber Optics", Second Edition, Academic Press Inc., New York, pp. 317-319, (1995).

Tsuzaki, T. et al., "Broadband Discrete Fiber Raman Amplifier with High Differential Gain Operating Over 1.65µm-band", OFC2001, MA3-1-MA3-3, (2001).

Giles, C. R. et al., "Polarization-Independent Phase Conjugation in a Reflective Optical Mixer", IEEE Photonics Technology Letters, vol. 7, No. 1, pp. 126-128, (Jan. 1995).

Sotobavashi, H. et al., "Effects of Asymmetric Power Change on BER Performance Using Midway Optical Phase Conjugation for Fading Cancellation in 60Ghz Millimetre-Wave Optical DSB Signal Transmission Over 100km Non-Dispersion-Shifted Fibre", Electronics Letters, vol. 35, No. 12, (Jun. 10, 1999).

* cited by examiner

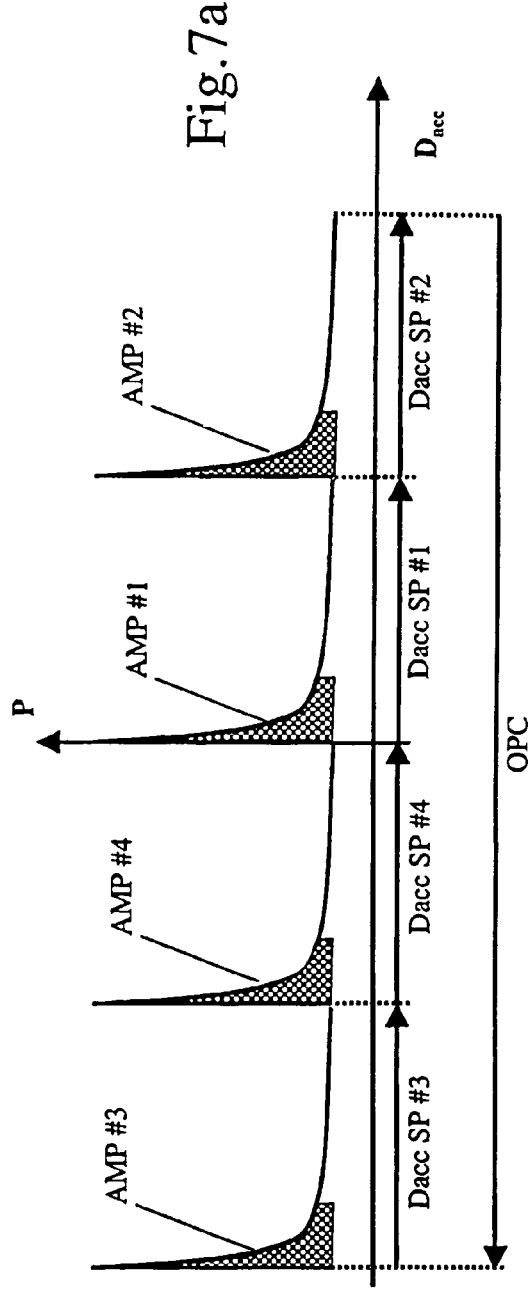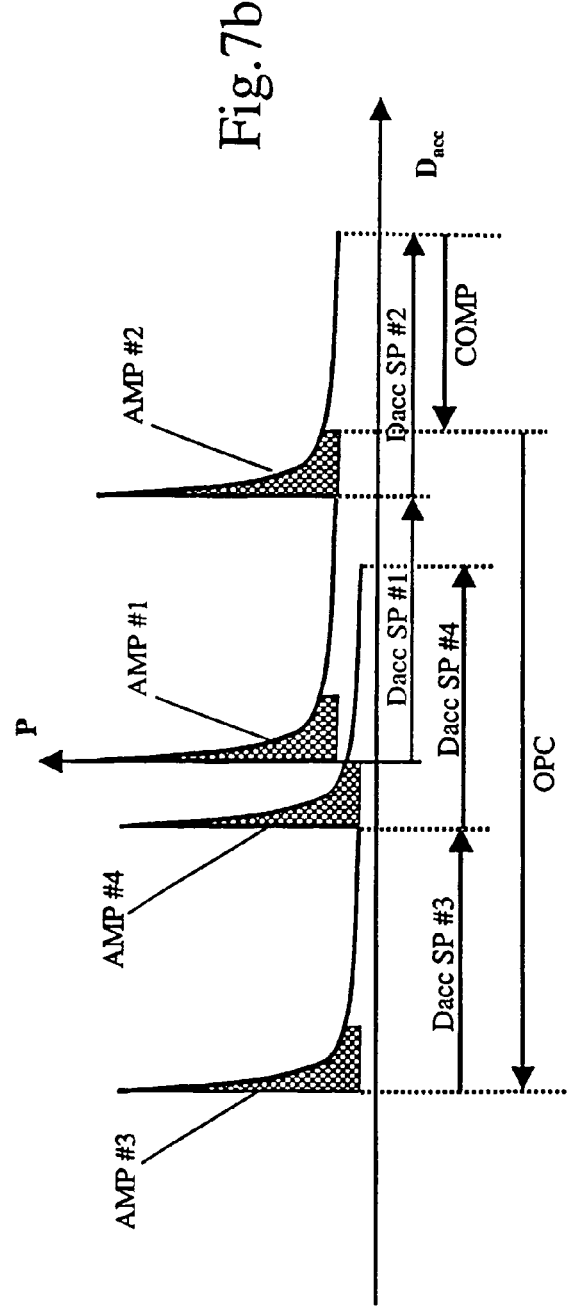

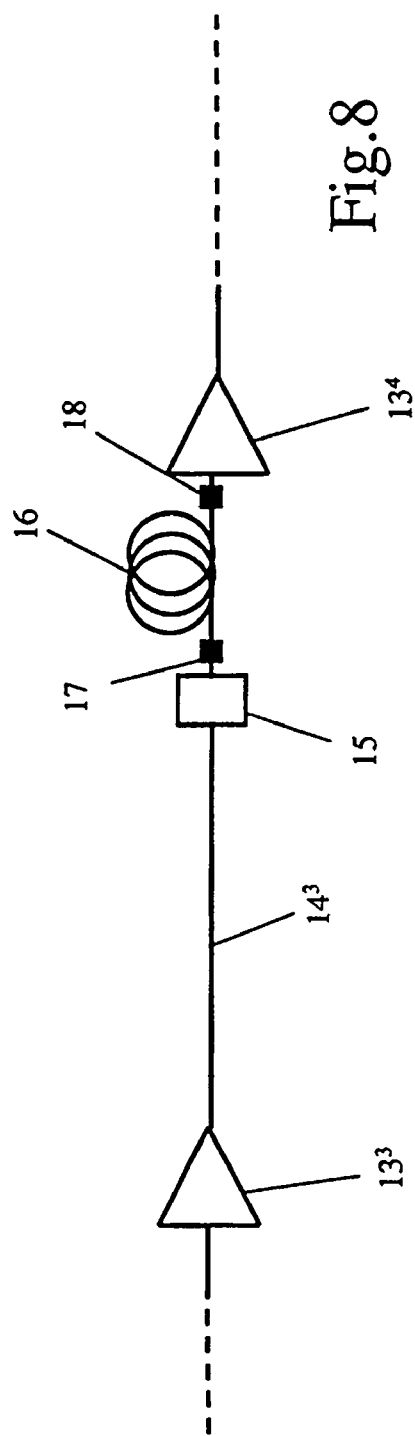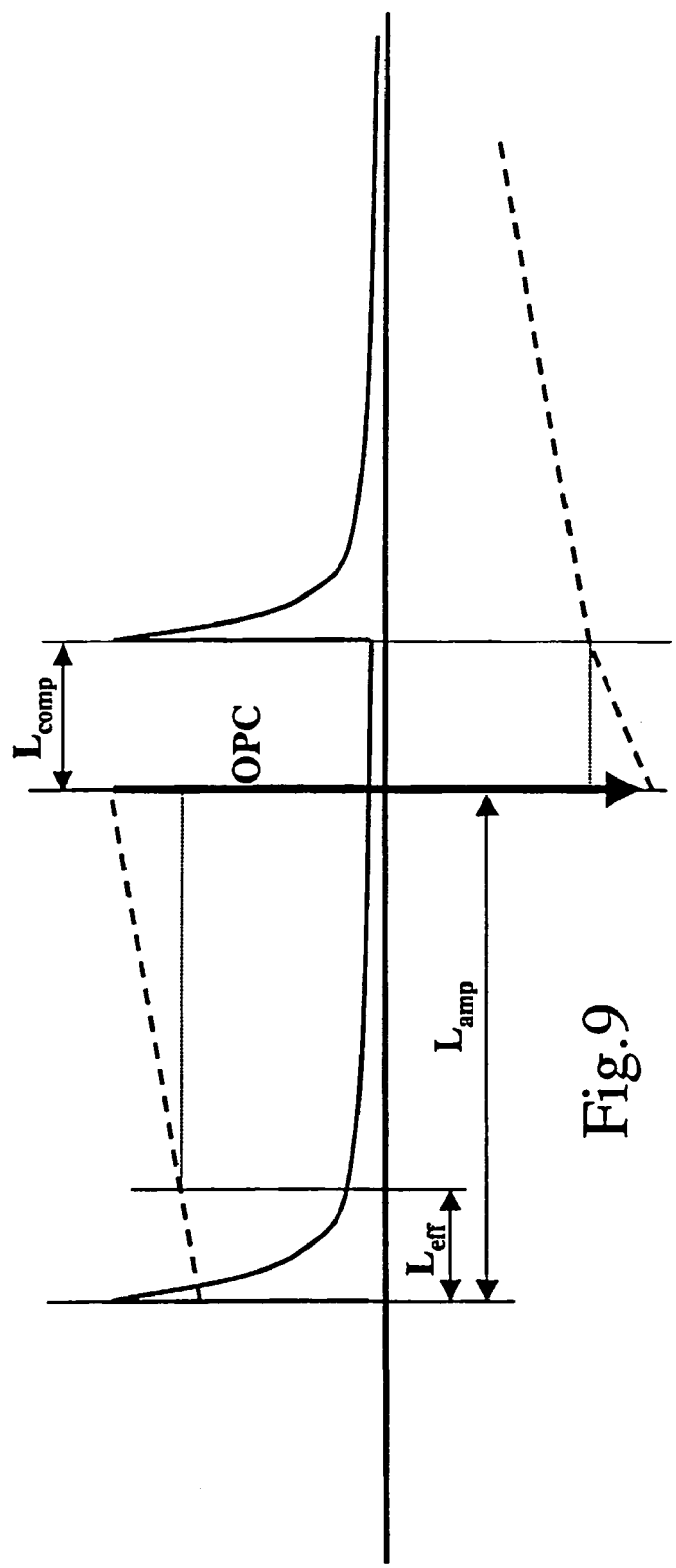

OPTICAL TRANSMISSION SYSTEM USING AN OPTICAL PHASE CONJUGATION DEVICE

CROSS REFERENCE TO RELATED APPLICATION

This application is a national phase application based on PCT/EP02/03251, filed Mar. 22, 2002, the content of which is incorporated herein by reference.

BACKGROUND OF THE INVENTION

1. Field of the Invention

The present invention relates to an optical transmission system using an optical phase conjugation device.

2. Description of the Related Art

Long-distance optical transmission systems have been constructed by using erbium-doped fiber amplifiers (ED-FAs) as in-line optical repeaters. Signal attenuation due to fiber loss is periodically compensated for by the optical amplifier gain to overcome the limitation of transmission distance. Since, in such systems, signal power is maintained at a high level along the entire system length owing to the periodic amplification, the dependence of fiber refractive index on optical power can no longer be ignored. This nonlinear effect, called the Kerr effect, leads to the self-phase modulation (SPM) of optical pulses, which in turn interplays with the group-velocity dispersion (GVD), or chromatic dispersion, in the fiber, causing nonlinear waveform distortion. In order to realize long-distance (e.g. 1000–2000 km or more) signal transmission at high data transmission rate (e.g. 40 Gbit/s or more) this waveform distortion must be counteracted.

Optical phase conjugation (OPC) is a known technique for chromatic dispersion compensation. Details may be found in G. P. Agrawal, "*Fiber-Optic Communication Systems*", A Wiley Interscience Publication, (1997), at paragraph 9.7. As explained by Agrawal, under certain conditions, OPC can compensate simultaneously for both GVD and SPM. Pulse propagation in a lossy optical fiber is governed by the Non-Linear Schrödinger Equation (NLSE)

$$\frac{\partial A}{\partial z} + \frac{i}{2}\beta_2 \frac{\partial^2 A}{\partial t^2} = i\bar{\gamma}|A|^2 A - \frac{1}{2}\alpha A \quad [1]$$

where $A=A(z, t)$ represents a slowly varying amplitude of a pulse envelope, $\beta_2$ is the GVD coefficient of the optical fiber, related to the dispersion parameter D by the following relation $$D = -\frac{2\pi c}{\lambda^2}\beta_2 \quad [2]$$

$\bar{\gamma}$ is the nonlinear coefficient of the optical fiber, i.e. governs the SPM, and $\alpha$ accounts for the fiber loss. When $\alpha=0$ (loss less case), $A^*$ satisfies the same equation when one takes the complex conjugate of eq. [1] and changes z to −z. As a result, midspan OPC can compensate for SPM and GVD simultaneously. Clearly, such case is immaterial, as fiber losses cannot be practically avoided.

In order to study the impact of the fiber loss, the following substitution may be made $$A(z,t)=B(z,t)\exp(-\alpha z/2) \quad [3]$$

so that eq. [1] can be written as $$\frac{\partial B}{\partial z} + \frac{i}{2}\beta_2 \frac{\partial^2 B}{\partial t^2} = i\gamma z|B|^2 B \quad [4]$$

where $\gamma(z)=\bar{\gamma}\exp(-\alpha z)$. By taking the complex conjugate of eq. [4] and changing z to −z, it can be seen that perfect SPM compensation can occur only if $\gamma(z)=\gamma(L-z)$, where L is the total system length. This condition cannot be satisfied for $\alpha\neq 0$.

One may think that the problem can be solved by amplifying the signal after midspan OPC such that the signal power becomes equal to the input power before the signal is launched in the second-half section of the fiber link. Although such an approach can reduce the impact of SPM, actually it does not lead to a satisfactory compensation of the SPM. Perfect SPM compensation can occur only if the power variations are symmetric around the midspan point where the OPC is performed so that $\gamma(z)=\gamma(L-z)$ in eq. [4]. In practice, signal transmission does not satisfy this property. One can come close to SPM compensation if the signal is amplified often enough that the power does not vary by a large amount during each amplification stage. This approach is, however, not practical since it requires closely spaced amplifiers.

S. Watanabe, in U.S. Pat. No. 6,175,435, considers a phase conjugator disposed between a transmission line I (of length $L_1$) and a transmission line II (of length $L_2$). After a series of calculations, he obtains the following equations for GVD and SPM compensation:

$$D_1 L_1 = D_2 L_2 \quad [5]$$

$$\gamma_1 \bar{P}_1 L_1 = \gamma_2 \bar{P}_2 L_2 \quad [6]$$

where $\bar{P}_1$ and $\bar{P}_2$ denote the average powers in the transmission lines I and II, respectively. Also, $D_1$ and $\gamma_1$ denote the dispersion parameter and the nonlinear coefficient in the transmission line I, respectively; and $D_2$ and $\gamma_2$ denote the dispersion parameter and the nonlinear coefficient in the transmission line II, respectively. According to the patent, complete compensation can be realized by providing, at positions equivalently symmetrical with respect to the phase conjugator, the same ratio of the optical Kerr effect to the dispersion. An increase of this ratio along the transmission line can be attained by gradually decreasing the dispersion or gradually increasing the optical Kerr effect. It is possible to change the dispersion value by adequately designing the fiber. For example, the above ratio is changeable by changing the zero dispersion wavelength of a dispersion shift fiber (DSF) or by changing the relative refractive index between the core and the clad of the fiber or the core diameter thereof. Meanwhile, change of the optical Kerr effect can be achieved by changing the nonlinear refractive index of the light intensity. According to Watanabe, a suitable optical fiber can be manufactured by continuously changing at least one fiber parameter selected from the loss, nonlinear refractive index, mode field diameter and dispersion.

In Applicant's opinion, the use of such kinds of "special" fibers does not represent an optimal solution, as such fibers may be complex to manufacture. Further, such method does not apply to optical systems already installed, unless a substitution of all the fibers of the system is performed.

C. Lorattanasane et al., in "Design Theory of Long-Distance Optical Transmission Systems Using Midway Optical Phase Conjugation", Journal of Lightwave Technology, vol. 15, no. 6, pages 948–955 (1997), describe a design method for suppressing the residual waveform distortion due to periodic power variation in an optical amplifier chain and to dispersion value fluctuation from span to span along a midway optical phase conjugation system. According to the authors, the amplifier spacing must be short relative to the nonlinearity length and signal pulses must be transmitted within appropriate windows of fiber dispersion. Computer simulation results reported in the article show that short amplifier spacing (40–50 km) is required for long-distance systems, whereas, for short-distance systems less than 1000 km, the amplifier spacing as long as 100 km is possible.

In Applicant's opinion, an amplifier spacing as long as 100 km also for long distance systems, having a length higher than 1000 km, is preferred, in order to reduce the number of installed amplifiers.

WO patent application no. 99/05805, to British Telecommunications PLC, discloses a method for symmetrised midspan spectral inversion (MSSI), where the high power regions in the optical communication system are symmetrised about the MSSI means. The amplifiers are positioned so as to have the high-power regions in the two sections of the transmission link symmetrical about the mid-point of the transmission network, where MSSI is performed. These high-power regions are the length of fiber immediately after the fiber amplifier which is substantially equal to the effective nonlinear length ($L_{eff}$) of the optical transmission link. The distance from the amplifier preceding the phase conjugator to the phase conjugator is $L_A$ and the distance from the phase conjugator to the subsequent amplifier is $L_B$. The distances $L_A$ and $L_B$ are given by $$L_A = \frac{L_{amp} + L_{eff}}{2} \qquad L_B = \frac{L_{amp} - L_{eff}}{2} \qquad [7]$$

where $L_{amp}=L_A+L_B$ is the amplifier spacing. In an example, $L_{amp}$ is 80 km, $L_{eff}$ is 21.5 km, so that the MSSI equipment would be sited at a distance of ≈51 km from the preceding amplifier. With an odd number of spans, if it is not possible to place the MSSI equipment at a location other than an amplifier site, the author suggests to add a length of fiber $L_{amp}-L_{eff}$ kilometers long immediately after the MSSI equipment at the amplifier location. Thus a length of fiber of 58.5 km would be added. With an even number of spans, the MSSI equipment is sited immediately upstream of the optical amplifier and a length of fiber $L_{eff}$ kilometers long is sited immediately upstream of the MSSI equipment. The author admits it may be necessary to insert additional amplifiers to give the symmetrical positioning of the high-power regions or if the optical signal levels are sufficiently low so as to cause bit error rate degradation.

In Applicant's opinion, a positioning of the optical phase conjugator very far from an amplifier (e.g. about 50 km) has a drawback in that the optical line has to be provided with a dedicated site for the MSSI equipment, in addition to the amplifier sites. Even when lengths of fibers are added as suggested in the '805 patent application in order to place the MSSI equipment at an amplifier site, the necessity arises of providing additional amplifiers to take into account the long length of the added fiber (in particular with an odd number of spans). Such combination of long added fiber and additional amplifiers may, in turn, unbalance the power distribution along the line, so that nonlinearity compensation may be hindered.

SUMMARY OF THE INVENTION

The Applicant has understood that these problems may arise due to the fact that only a symmetric dispositions in space, that is, in physical length of fiber, has been considered in '805 patent application for the high power regions with respect to the position of the OPC device. The Applicant has found that more advantageous system configurations for reducing nonlinearity exploiting an OPC device may be implemented by considering symmetrised dispositions of the high power regions with respect to the dispersion accumulated along the fiber path, rather than with respect to the fiber path itself.

More particularly, the Applicant has found that nonlinearity may be substantially reduced in a system comprising spans of transmission optical fiber separated by optical amplifiers by associating an optical phase conjugation to an optical amplifier, advantageously in the same site including the optical amplifier, the optical phase conjugation device being in combination with a dispersion compensator, suitable for introducing an amount of accumulated dispersion such as to substantially compensate the dispersion accumulated in a portion of a span having a length ($L_{amp}-L_{eff}$), wherein $L_{amp}$ is the average span length and $L_{eff}$ is the effective length of the optical fibers used in the spans. For the purposes of the present invention, by "dispersion compensator" (or simply "compensator") of a portion of a span having a length $L_x$ it has to be intended a device having a length $L_{comp}<L_x$, capable of introducing an amount of accumulated dispersion equal, in absolute value, to the accumulated dispersion introduced in the portion of the span. Accordingly, the dispersion compensator used in the present invention has a length $L_{comp}<(L_{amp}-L_{eff})$. Preferably the dispersion compensator has a length $L_{comp} \leq (L_{amp}-L_{eff})/3$. For example, the compensator may be a dispersion compensating optical fiber. If the compensator introduces an amount of accumulated dispersion having the same sign of the dispersion accumulated along the optical fiber used in the spans, the OPC device is placed upstream from the compensator. If the compensator introduces an amount of accumulated dispersion having opposite sign with respect to the dispersion accumulated along the optical fiber used in the spans, the OPC device is placed downstream from the compensator. The compensator may have a length much lower than ($L_{amp}-L_{eff}$). Reducing length and attenuation of the dispersion compensator allows to limit the onset of nonlinear effects. Nonlinear effects can be further reduced by appropriately selecting the material or medium used in the dispersion compensator.

In a first aspect the invention relates to an optical system comprising an optical fiber path suitable for propagating an optical signal at least in a first direction; a plurality M of optical amplifiers, disposed along said optical fiber path, so as to divide said optical fiber path in N spans of optical fiber, said spans of optical fiber having substantially a length $L_{amp}$ and comprising at least one transmission optical fiber having an effective length $L_{eff}$; and an optical phase conjugation device associated to an amplifier of said plurality of amplifiers. In the optical system, the optical phase conjugation device is disposed in combination with a dispersion compensator, said compensator being disposed upstream from said amplifier associated to the optical phase conjugated device, said compensator being adapted for introducing an accumulated dispersion such as to substantially compensate a dispersion accumulated in a portion having a length $(L_{amp}-L_{eff})$ of a span immediately upstream from said amplifier associated to said optical phase conjugation device.

The dispersion compensator can have a sign of dispersion equal to or respectively opposite with respect to a sign of dispersion of said span immediately upstream from said amplifier at a wavelength of said optical signal, and said optical phase conjugation device is disposed upstream or respectively downstream from said dispersion compensator.

The dispersion compensator can include a length of optical fiber, preferably having an absolute value of dispersion coefficient higher than or equal to three times the dispersion coefficient of said transmission optical fiber at a wavelength of the optical signal.

Alternatively, the dispersion compensator can include a chirped fiber grating.

The optical amplifiers can comprise erbium-doped fiber amplifiers.

The system can comprise a transmitting station, a receiving station, said transmitting station being connected at an input end and said receiving station being connected to an output end of said optical fiber path.

In a second aspect the invention relates to a method for assembling an optical system comprising the steps of: providing a plurality M of optical amplifiers; connecting said plurality of optical amplifiers by N spans of optical fiber so as to form an optical fiber path, the spans of optical fiber having substantially a length $L_{amp}$ and comprising at least one transmission optical fiber having an effective length $L_{eff}$; associating a phase conjugation device to an amplifier along said optical fiber path. The step of associating comprises: disposing a compensator upstream from said amplifier associated to the optical phase conjugated device, and disposing said phase conjugation device in combination with said dispersion compensator, said compensator being adapted for introducing an accumulated dispersion such as to substantially compensate a dispersion accumulated in a portion having a length $(L_{amp}-L_{eff})$ of a span immediately upstream from said amplifier associated to said optical phase conjugation device.

In a third aspect the invention relates to a method of operating of an optical transmission system comprising an optical fiber path comprising at least one transmission optical fiber having an effective length $L_{eff}$ and a plurality of optical amplifiers disposed along said optical fiber path, so as to divide said optical fiber path in N spans of optical fiber having substantially a length $L_{amp}$. The method comprises: inserting an optical signal at an input end of said optical fiber path; amplifying said optical signal along said fiber spans by said plurality of optical amplifiers; accumulating a dispersion of said optical signal along the optical fiber path; phase-conjugating said optical signal near a first amplifier of said plurality of optical amplifiers, so that said optical signal diminishes its accumulated dispersion, in absolute value, after said step of phase-conjugating. The method further comprises passing said optical signal, before said first amplifier, through a compensator, said compensator introducing an accumulated dispersion such as to substantially compensate a dispersion accumulated in a portion having a length $(L_{amp}-L_{eff})$ of a span immediately upstream from said first amplifier.

In a fourth aspect the invention relates to a method of upgrading an optical transmission system comprising an optical fiber path, the optical fiber path including at least one transmission optical fiber having an effective length $L_{eff}$ and a plurality of optical amplifiers disposed along the optical fiber path, so as to divide the optical fiber path in N spans of optical fiber having substantially a length $L_{amp}$. The method comprises disposing a phase conjugation device in association with one of said plurality of optical amplifiers, in combination with a dispersion compensator disposed upstream from said one amplifier, said compensator being adapted for introducing an accumulated dispersion such as to substantially compensate a dispersion accumulated in a portion having a length $(L_{amp}-L_{eff})$ of a span immediately upstream from said one amplifier associated to said optical phase conjugation device.

BRIEF DESCRIPTION OF THE DRAWINGS

Further features and advantages of the present invention will be better illustrated by the following detailed description, herein given with reference to the enclosed drawings, in which:

FIGS. 7a and 7b schematically show plots of the optical power versus accumulated dispersion, respectively for a system according to the prior art and for a system according to the first embodiment of the invention;

FIG. 8 shows a portion of a second embodiment of optical system according to the invention;

FIG. 9 schematically shows a plot of the optical power of an optical signal traveling in the portion of optical system according to FIG. 8 (continuous line) and a plot of the accumulated dispersion thereof (dashed line);

DETAILED DESCRIPTION OF THE INVENTION

Figure 1:
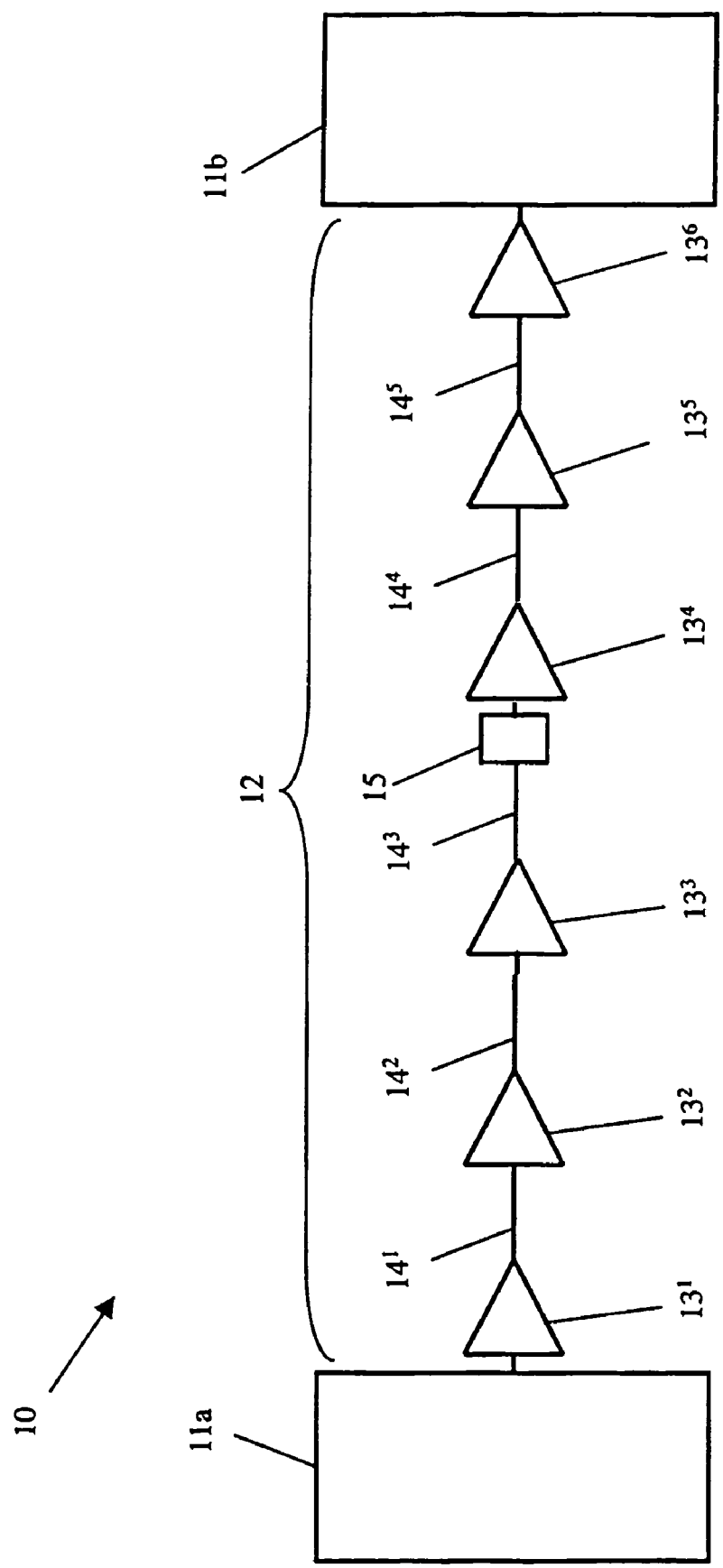
FIG. 1 schematically shows an optical transmission system according to the invention.

FIG. 1 schematically shows an optical transmission system 10 according to the invention, comprising a transmitting station 11a, adapted to transmit optical signals over an optical fiber path 12, and a receiving station 11b, adapted to receive optical signals coming from the optical fiber path 12. The transmitting station 11a comprises at least one transmitter. The receiving station 11b comprises at least one receiver. For WDM transmission, stations 11a, 11b comprise a plurality of transmitters and receivers, for example twenty or thirty-two or sixty-four or one hundred transmitters and receivers. The transmission system may include transmitting and receiving stations and an optical fiber path to transmit signals in a direction opposite to that of optical fiber path 12. Terminal and line apparatuses operating in the two directions often share sites and facilities.

The transmitter or transmitters included in the transmitting station 11a provide an optical signal to be coupled into the optical fiber path 12. Typically, each transmitter may comprise a laser source, adapted to emit a continuous wave optical signal having a predetermined wavelength, and an external optical modulator, for example a lithium niobate modulator, adapted to superimpose on the continuous wave optical signal emitted by the laser source a traffic signal at a predetermined high frequency or bit rate, such as for example 10 Gbit/s or 40 Gbit/s. Alternatively, the laser source may be directly modulated with the traffic signal. A preferred wavelength range for the optical signal radiation is between about 1460 nm and about 1650 nm. A more preferred wavelength range for the optical signal radiation is between about 1520 nm and about 1630 nm. Optical signals may be of the return-to-zero (RZ) format or non-return-to-zero (NRZ) format. Typically, in case of WDM transmission each transmitter may also comprise a variable optical attenuator, adapted to set a predetermined power level for each signal wavelength (pre-emphasis level). In case of WDM transmission, the different signal wavelengths emitted by the plurality of transmitters are multiplexed by a suitable multiplexing device on the optical fiber path 12. Such multiplexing device can be any kind of multiplexing device (or combination of multiplexing devices), such as a fused fiber or planar optics coupler, a Mach-Zehnder device, an AWG (Arrayed Waveguide Grating), an interferential filter, a micro-optics filter and the like.

Each receiver is adapted to convert an incoming optical signal in an electrical signal. Typically, this task may be provided by a photodetector. The receiver may also extract the traffic signal from the electrical signal. For a WDM transmission, a plurality of photodetectors is provided. A demultiplexing device allows to separate the different signal wavelengths from a single optical path to a plurality of optical paths, each terminating with a receiver. The demultiplexing device can be any kind of demultiplexing device (or combination of demultiplexing devices), such as a fused fiber or planar optics coupler, a Mach-Zehnder device, an AWG (Arrayed Waveguide Grating), an interferential filter, a micro-optics filter and the like.

The optical fiber path 12 comprises at least one transmission optical fiber. The transmission optical fiber used in the optical fiber path 12 is a single mode fiber. For example, it can be a standard single mode optical fiber (SMF), having chromatic dispersion between approximately +16 ps/(nm·km) and +20 ps/(nm·km) at a wavelength of 1550 nm, or a dispersion-shifted fiber (DSF), having a dispersion approaching zero at a wavelength of 1550 nm, or a non-zero dispersion fiber (NZD), with dispersion of between approximately 0.5 ps/(nm·km) and 4 ps/(nm·km), in absolute value, at a wavelength of 1550 nm, or a fiber of the half-dispersion-shifted type (HDS) having a positive dispersion which is intermediate between that of an NZD type fiber and a standard single-mode fiber. In order to reduce the occurrence of four-wave-mixing (FWM), the optical transmission fiber or fibers included in the optical fiber path 12 may preferably have a dispersion which is greater than or equal to approximately 0.5 ps/(nm·km), more preferably greater than or equal to 1 ps/(nm·km), in absolute value, at a wavelength of 1550 nm. Preferably, if the optical signals are of the RZ format, a transmission fiber having a chromatic dispersion higher than 15 ps/(nm·km) in absolute value at 1550 nm may be used, for example a SMF fiber. Preferably, if the optical signals are of the NRZ format, a transmission fiber having a negative chromatic dispersion lower than 10 ps/(nm·km) in absolute value at 1550 nm may be used.

A plurality of M optical amplifiers is disposed along the optical fiber path 12, so as to divide the optical fiber path 12 in a plurality of fiber spans. In FIG. 1 six optical amplifiers $13^1, 13^2 \ldots, 13^6$ are disposed along the optical fiber path 12, so that five fiber spans $14^1, 14^2 \ldots, 14^5$ may be identified. Typically the optical amplifiers are included in suitable amplification sites along the optical path.

For example, an optical amplifier suitable to be used in the system according to the present invention is an erbium doped fiber amplifier, comprising at least one pump source suitable for providing an optical pumping radiation, at least one erbium doped fiber and at least one coupler device suitable for coupling the pumping radiation and an optical signal to be amplified into the erbium doped fiber or fibers, e.g. a WDM coupler. Suitable pumping radiation may preferably have a wavelength in a range around 1480 nm or in a range around 980 nm.

Another exemplary optical amplifier suitable to be used in the system according to the present invention is a semiconductor amplifier, comprising an electrical pump source suitable for providing electrical power and a semiconductor optical amplifying element comprising an electrode structure adapted for connection to the electrical pump source.

A further example of optical amplifier suitable to be used in a system according to the present invention is a lumped Raman amplifier, comprising at least one pump source adapted for providing an optical pumping radiation having a power and a wavelength suitable for causing Raman amplification in a piece of optical fiber especially adapted for obtaining high Raman amplification in a length of several km (Raman fiber), typically having a low effective area, included in the optical amplifier, and at least one coupler device suitable for coupling such pumping radiation into the Raman fiber, e.g. a WDM coupler. In order to have Raman amplification, the wavelength of the pumping radiation should be shifted with respect to the wavelength of the signal radiation in a lower wavelength region of the spectrum, such shift being equal to the Raman shift (see G. P. Agrawal, "Nonlinear Fiber Optics", Academic Press Inc. (1995), pag. 317–319) of the material comprised in the core of the Raman fiber. For typical silica/germania-based fibers the Raman shift is equal to about 13.2 THz. For signal wavelengths around 1550 nm, pumping radiation wavelengths suitable for Raman amplification may have a wavelength around 1450 nm. As an example, a fiber suitable for a lumped Raman amplifier is disclosed in the article: T. Tsuzaki et al., "*Broadband Discrete Fiber Raman Amplifier with High Differential Gain Operating Over 1.65 μm-band*", OFC2001, MA3-1.

N fiber spans $14^1, 14^2 \ldots, 14^N$ are identified between the transmitting station 11a and the receiving station 11b as the portions of optical fiber path 12 lying between the M optical amplifiers $13^1, 13^2 \ldots 13^M$. If the last optical amplifier disposed along the optical fiber path 12 is disposed immediately upstream from the receiving station 11b, for setting the power of the optical signal to a suitable level before the introduction in the receiving station 11b, the number M of optical amplifiers is higher than the number N of the spans by a unity (M=N+1). If a span of fiber is placed between the last optical amplifier and the receiving station 11b, it holds M=N. Preferably, the optical fiber path 12 comprises an even number of fiber spans N.

Preferably, the length of each span is greater than or equal to 40 km, more preferably greater than or equal to 80 km. Shorter span lengths may be provided, in particular, in long-haul systems, i.e. systems having an overall length exceeding several thousands of km, e.g. 10,000 km, in which the onset of nonlinear effects may sum up along the optical fiber path, until high levels. On the other hand, greater span lengths in excess of 80 km are desirable for systems having an overall length of no more than 2–3000 km, in which the onset of nonlinear effects may occur due to an increase of the overall optical power of the signal sent on the optical fiber path (for example due to an increase of the channels sent in a WDM system) and/or of the bit rate of the system.

Preferably, the optical amplifiers $13^1 \ldots 13^M$ are disposed substantially periodically along the optical fiber path 12, that is, the length of the fiber spans $14^1 \ldots 14^N$ is substantially the same. Practically, this may correspond to a variation of the length of the spans in the system of at most 10%, preferably 5%, of the average length of the spans. More particularly, a lower variation may be desirable for systems having, for example, overall length in excess of 1500 km, and/or using a bit rate of 40 Gbit/s or more, and/or using a high number of channels.

An optical phase conjugation (OPC) device 15 is disposed along the optical fiber path 12 near one of the optical amplifiers. The OPC device 15 may be a device capable of inverting the spectrum of the channels transmitted along the line, i.e. a device for spectral inversion. Additionally, such device may modify the central wavelength of the inverted channels. Preferably, the OPC device 15 is a polarization-independent device. Preferably, it comprises a non-linear medium through which the optical channels and at least one linearly polarized pumping radiation pass twice, in one direction on the first pass and in the opposite direction on the second pass. On the second pass, the optical channels pass through the non-linear medium after undergoing a rotation of π/2 of their polarization state. The polarization state of the pumping radiation remains unchanged throughout the double pass. An example of a device of this type is described in the article by C. R. Giles, V. Mizrahi and T. Erdogan, "*Polarization-Independent Phase Conjugation in a Reflective Optical Mixer*", IEEE Photonics Technology Letters, Vol. 7, No. 1, pp. 126–8 (1995). Typically, the OPC device 15 can comprise one or more devices for filtering the residual wavelengths of the non-linear wavelength conversion process. Additionally, the OPC device can comprise one or more devices for amplification of the phase conjugated channels or, in general, for total or partial compensation of the attenuation of the phase conjugator. Preferably, the wavelength conversion may be carried out so as to provide phase conjugated signals having a wavelength shifted of not more than 5 nm with respect to the wavelength of the signals inputted in the OPC device. In order to perform the phase conjugation of many different channels, a multi-channel OPC device of the type described in U.S. Pat. No. 5,365,362 may be used. The disposition of the OPC device near the optical amplifier will be discussed in great detail in the following.

Figure 2:
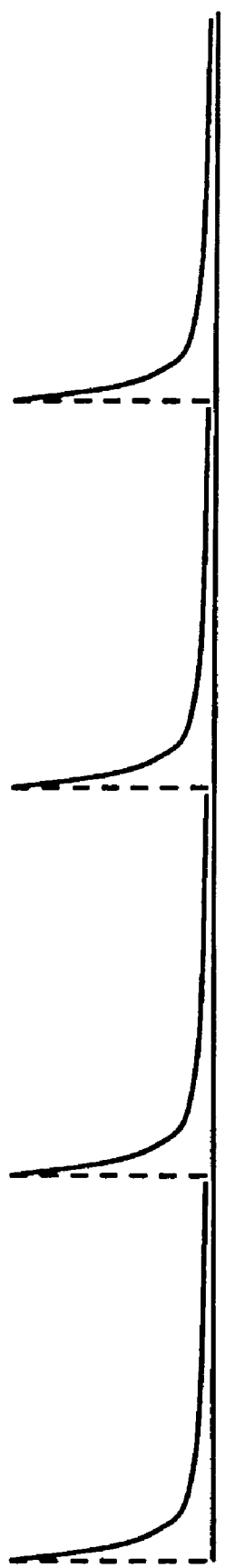
FIG. 2 schematically shows a power profile that can be obtained along the optical fiber path of the system of FIG. 1 using lumped erbium doped fiber amplifiers.

At the output of each optical amplifier the power of the optical signal is increased to a level determined by the optical gain provided by the amplifying medium. FIG. 2 schematically shows an optical power profile that can be obtained along a portion of the optical fiber path 12 of the system of FIG. 1 with a chain of lumped amplifiers (e.g. EDFAs): the position of the optical amplifiers is shown by the dashed vertical lines. In particular, in FIG. 2 it is shown that the power increases abruptly in a very small length, corresponding to the overall length of the lumped amplifier (e.g. few meters for an EDFA, few millimeters or even less in a semiconductor amplifier, some km for a lumped Raman amplifier), and then diminishes progressively due to the attenuation introduced by the optical fiber included in the span downstream from the amplifier, until the next optical amplifier, in which the power increases abruptly another time, and so on. As schematically shown by FIG. 2 the power profiles upstream and downstream from the optical amplifiers are clearly not symmetrical with respect to the position of the optical amplifiers.

Figure 3B:
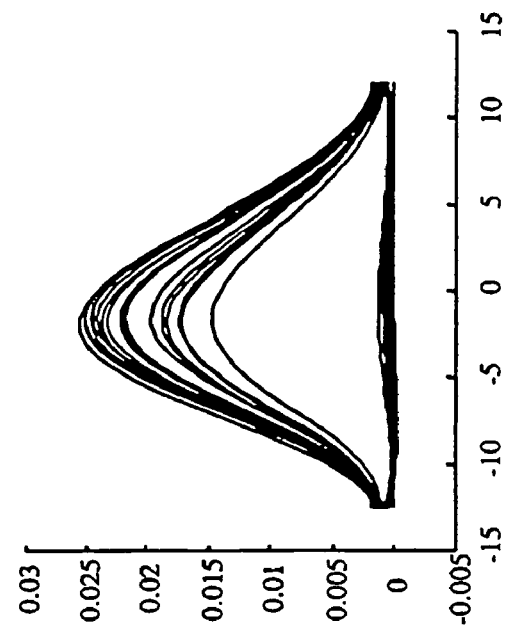
FIGS. 3a and 3b show how the eye opening may worsen due to the onset of nonlinearity in a high power transmission system.
Figure 3A:
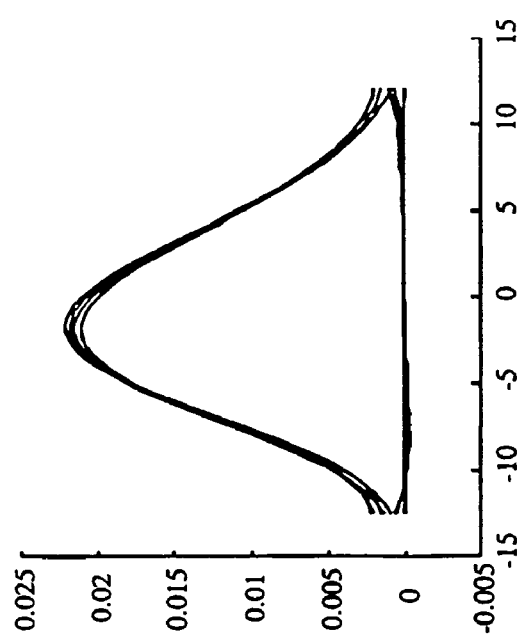

The maximum level of optical power along the optical fiber path, that is the height of the peaks in FIG. 2, depends on many factors. Typically, it depends on the optical gain introduced by the optical amplifiers: such optical gain may be for example regulated as a function of the overall length of the system, and/or of the span lengths, and/or of the number of the channels in a WDM system. A system having higher bit rate may reach higher power level along the optical fiber path with respect to a system having lower bit rate, as the available time slot for each bit of information is lower. Today there is a great interest in increasing the bit rate of optical systems from values of about 2.5 Gbit/s or 10 Gbit/s to higher values such as 40 Gbit/s or more. An increase of the bit rate may cause a corresponding increase of the impact of nonlinear effects, as the reached power levels along the line may be very high. As an example, FIGS. 3a and 3b show the result of two simulations made by considering the launch of a single optical channel at 40 Gbit/s having an average power of 10 dBm in a system having a length of 400 km and with perfect compensation of chromatic dispersion. In FIG. 3a nonlinear effects were canceled by setting to zero the nonlinear coefficient of the fiber. In FIG. 3b a nonlinear coefficient of 1.3 1/(W·km) was introduced. As it can be seen, the eye opening is much lower in FIG. 3b, even in a system having a relatively low length, due to the onset of nonlinear effects. It has to be noticed that the value of 10 dBm of average power of the optical channel was chosen only for simulation purposes: it has to be intended that the invention applies also to systems using lower average power signals.

In order to locate the portions of optical fiber path in which the power level of the optical signal reaches high values, the effective length $L_{eff}$ may be used:

$$L_{eff} = \frac{1 - e^{-\alpha L_{amp}}}{\alpha} \quad [8]$$

where $L_{amp}$ is the average span length and a is the attenuation coefficient of the transmission fiber at the signal wavelength, expressed in Nepers·km$^{-1}$ in place of more usual units dB/km: the attenuation in Nepers·km$^{-1}$ may be obtained by multiplying the attenuation expressed in dB/km by a factor $\log_e(10)/10$. For the purposes of the present invention, the effective length calculated with formula [8] may be approximated to:

$$L_{eff} = \frac{1}{\alpha} \quad [9]$$

as the exponential value at the numerator of formula [8] is close to zero for typical values of attenuation and span length.

In practice, the effective length calculated with formula [9] results to be about 20 km for typical transmission fibers having an attenuation coefficient of 0.2 dB/km. The effective length calculated with formulas [8] or [9] may be roughly used as a measure of the portion of fiber span in which the power level of the optical signal reaches values that can cause nonlinearity to be detrimental for correct transmission. In other words, in a portion of fiber span downstream from the output of an optical amplifier at a distance greater than an effective length one can say that nonlinear effects do not play a substantial role, so that the distortion of the signal in that span portion may be substantially due only to linear effects, such as chromatic dispersion.

It is known that the inclusion of an OPC 15 in an optical system may reduce the negative effects produced on the optical signal by nonlinearity. The OPC device positioning has been related in the prior art to the compensation of the chromatic dispersion, so that the OPC device was at the mid-span point of the system, in proximity of the amplifier closer to the mid-span point. However, the Applicant has found that such positioning may not guarantee a sufficient reduction of the impact of nonlinear effects in many cases, in particular for systems having high bit rate (e.g. 40 Gbit/s) and/or long span lengths. According to the Applicant, even if the positioning of the OPC device near the mid-span point of the system may reduce nonlinearity, as the high power regions are disposed roughly symmetrically with respect to the OPC device, the intrinsic asymmetry of the single high-power regions may still cause high levels of penalty at the receiver. In particular this problem may arise with long average span lengths, i.e. in excess of two-three times the effective length, in which the power distribution along each span has a great excursion between very high power values (at the output of the amplifiers) and very low power values (at the end of the spans), i.e. more than about 3 dB below the maximum power level.

The Applicant has found that such problem may be solved by compensating the chromatic dispersion (or, more simply, dispersion) accumulated in a portion of the fiber span immediately upstream from the amplifier near which the OPC device is disposed. The compensation is made immediately upstream such amplifier. The compensator used substantially compensates the dispersion accumulated by an optical signal traveling along the optical fiber path in a portion of span having a length of $(L_{amp}-L_{eff})$. For the purposes of the present invention, a substantial compensation occurs when the dispersion accumulated along the optical path of length $(L_{amp}-L_{eff})$ is compensated at a level between 85% and 115%. Preferably, compensation may occur at a level of at least 90%. Preferably, compensation may occur at a level of at most 110%.

As defined above, for the purposes of the present invention a dispersion compensator is a device shorter than the length of span portion whose dispersion it compensates. Preferably the length of the dispersion compensator is shorter than ⅓ of the length of the span portion whose dispersion it compensates. The dispersion compensator may be an optical fiber having a dispersion coefficient D greater in absolute value than the D of the span portion whose dispersion it compensates, preferably greater by at least three times. For example, it can be a dispersion compensating fiber, or even a transmission fiber with a greater D than the D of the fibers included in the span portion whose dispersion is compensated. The dispersion compensator may even be much shorter that the span portion, for example it can be fiber grating dispersion compensator based on a chirped fiber grating, with a length in the range from tens of centimeters to few meters, or an optical waveguide device, a micro optics device, or another compact device. In general, the relatively short length and/or low attenuation of the dispersion compensator of the invention achieves the advantage of limiting the onset of additional nonlinear effects, even if an amplifier is combined with the compensator to recover the compensator loss.

Figure 4:
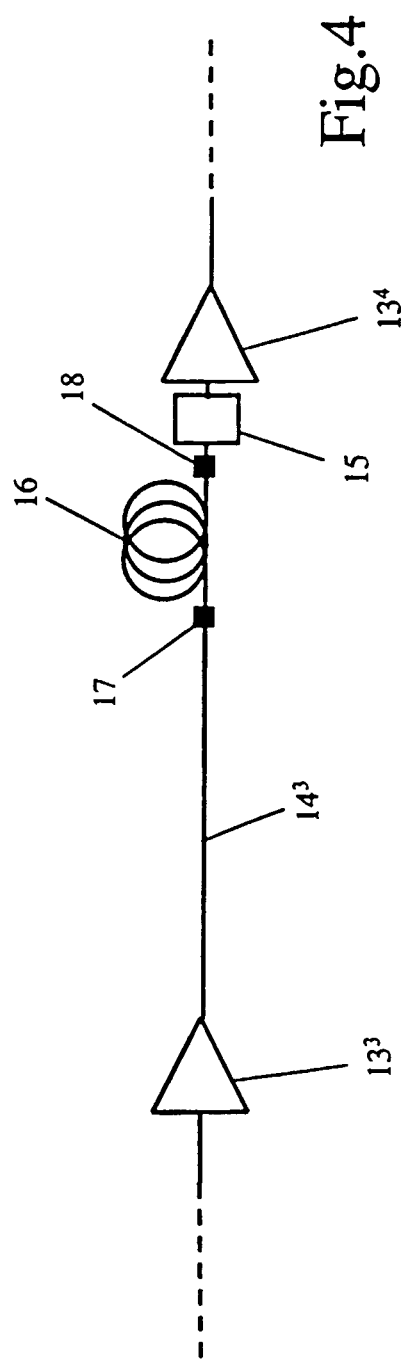
FIG. 4 shows a portion of a first embodiment of optical system according to the present invention.

According to a first preferred embodiment, a dispersion compensator 16, e.g. a length of dispersion compensating optical fiber, having a sign of the dispersion opposite with respect to the sign of the dispersion coefficient of the transmission fiber included in the fiber spans is added. In alternative to a dispersion compensating optical fiber, a different type of compensator can be used, such as for example a dispersion compensating grating. FIG. 4 is a schematic enlargement of the portion of optical line including the OPC device 15 of the system 10 in FIG. 1. As it can be seen, the compensator 16 is arranged upstream from an optical amplifier 13$^4$ disposed along the optical line. The OPC device is connected to the optical amplifier 13$^4$. The compensator 16 is connected at a first end 17 to the output of the span 14$^3$ immediately upstream from the amplifier 13$^4$ and at a second end 18 to the OPC device 15. In an alternative configuration, not shown, the OPC device 15 may be connected downstream from the optical amplifier 13$^4$, so that the compensator is connected between the output end of the span 14$^3$ and the input end of the optical amplifier 13$^4$.

Figure 5:
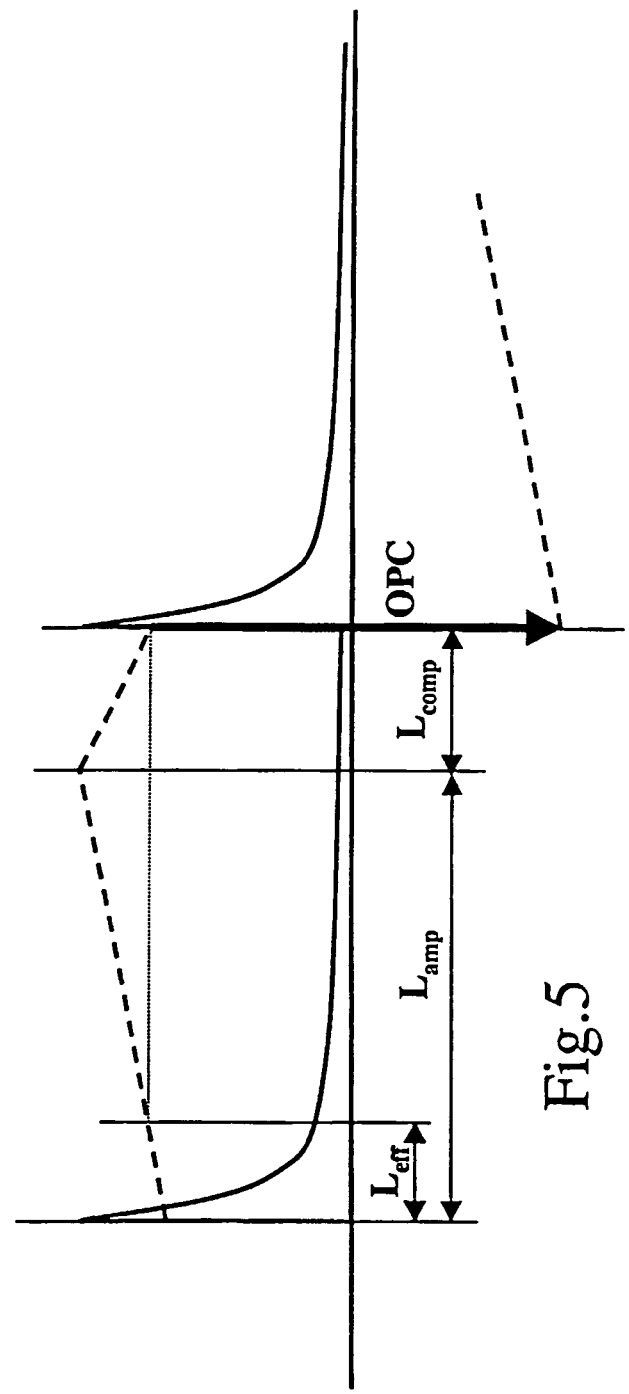
FIG. 5 schematically shows a plot of the optical power of an optical signal traveling in the portion of optical system according to FIG. 4 (continuous line) and a plot of the accumulated dispersion thereof (dashed line)

FIG. 5 schematically shows the corresponding behavior of the optical power and of the chromatic dispersion of a signal traveling in the portion of optical line shown in FIG. 4. For example, it may be assumed that the sign of dispersion of the transmission fiber included in the spans of the optical line is positive at the signal wavelength, so that the sign of dispersion of compensator 16 is negative. The behavior of the optical power of the optical signal is shown in FIG. 5 by the continuous line. As it can be seen, the optical power increases up to a maximum level at the amplifier 13$^3$ and then decreases due to the attenuation of the fiber included in the span 14$^3$. After a portion of span having a length $L_{eff}$, the optical power has decreased until a level at which it may be supposed that nonlinear effects do not play a substantial role, so that the optical system behaves practically linearly. At the end of the span, that is, after a length $L_{amp}$, the signal passes through the compensator 16 and the OPC device 15, and then is re-amplified by amplifier 13[4], so that the optical power increases abruptly to the maximum level, and so on. Advantageously, the optical power is already sufficiently low when the optical signal enters in the compensator 16, so that nonlinearity is not added by the presence of the compensator 16. On the other hand, the behavior of accumulated dispersion is shown in FIG. 5 by the dashed line. As it can be seen, the accumulated dispersion grows substantially linearly along the span 14[3], starting from an initial value which practically depends on the distance of the considered span from the insertion point of the signal in the optical line. If $D_f$ is the dispersion coefficient at the signal wavelength of the transmission optical fiber included in the fiber span 14[3], the total accumulated dispersion in the span is $D_f L_{amp}$. The compensator 16 has a length $L_{comp}$ suitable for compensating a portion of the dispersion accumulated in the fiber span 14[3]. More particularly, as it can be seen in FIG. 5, the length $L_{comp}$ is chosen so that the compensator 16 substantially compensates for the accumulated dispersion in a portion of span having a length ($L_{amp}-L_{eff}$). After the passage through the compensator 16, the optical signal enters in the OPC device 15, for being subjected to phase conjugation (arrow in FIG. 5). At the output of the OPC device 15, the sign of the accumulated dispersion of the optical signal is changed, whereas its absolute value remains substantially unchanged. Downstream from the OPC device, the accumulated dispersion diminishes in absolute value, leading towards dispersion compensation at a certain point along the system, typically near the end of the optical line. Due to the added compensator 16, a residual dispersion may remain uncompensated at the end of the optical system. A suitable additional compensator may be provided at the end of the system in order to compensate such residual dispersion.

Figure 6:
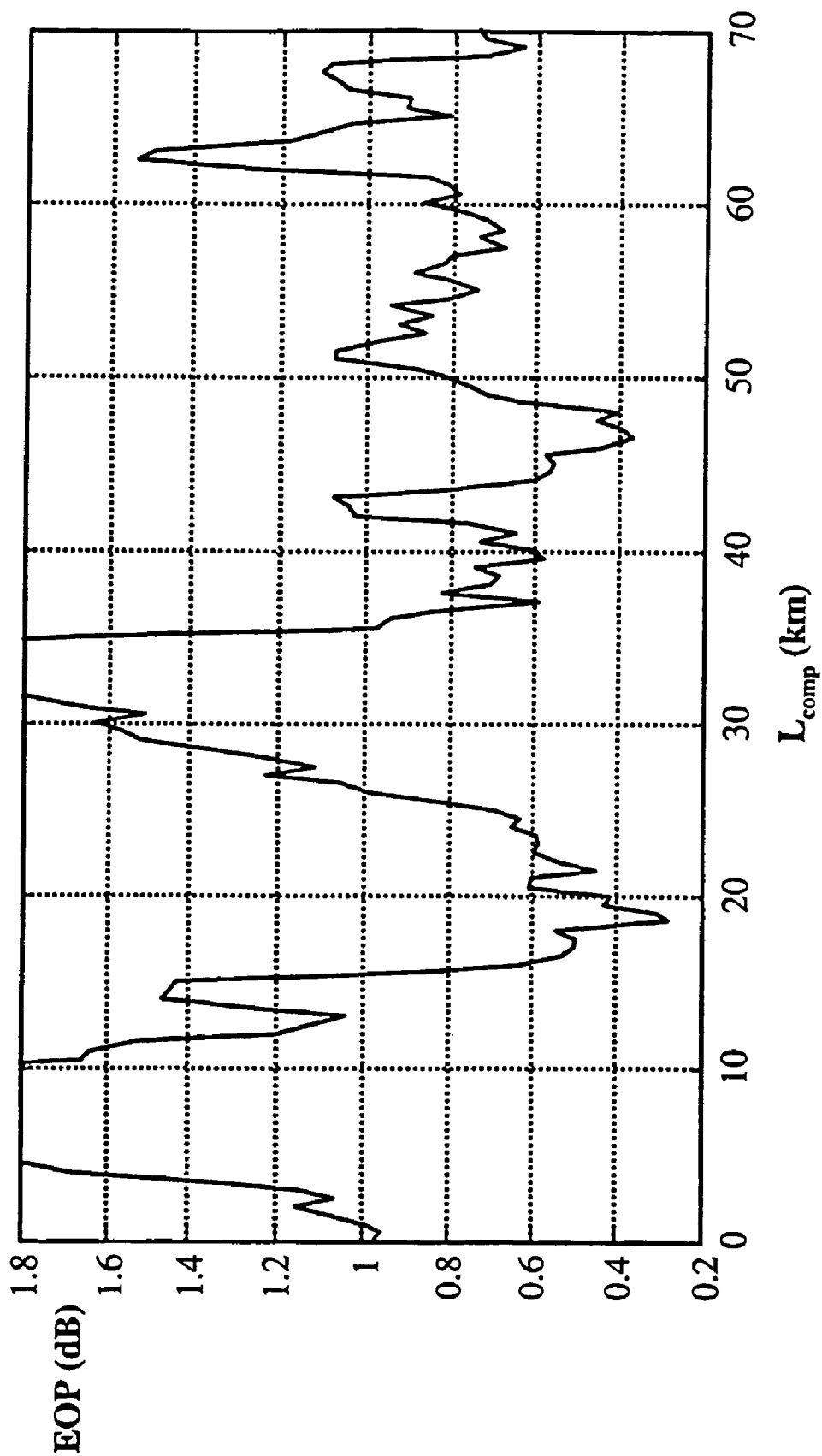
FIG. 6 shows the eye opening penalty versus the length of added compensating fiber, obtained in a simulated system of 600 km according to the first embodiment of the invention.

The Applicant has found that a configuration according to the first embodiment above described with reference to FIGS. 4 and 5 allows to reduce the impact of nonlinearity. In a third simulation performed by the Applicant, an optical signal was sent in a system including six spans of length $L_{amp}=100$ km of a fiber having an attenuation coefficient of 0.25 dB/km ($L_{eff} \cong 17$ km), a nonlinear coefficient of 1.3 1/(W·km) and a dispersion coefficient, expressed as a group velocity dispersion, of −20 ps²/km. At the input of each span, the optical power of the optical signal was set to 10 dBm. An ideal OPC device, performing only phase conjugation, was disposed at the end of the third span, before an amplifier. Different lengths of a dispersion compensating fiber having a dispersion coefficient, expressed as group velocity dispersion, of +80 ps²/km were added at the end of the third span, upstream from the OPC device. For each length of dispersion compensating fiber considered, the eye opening penalty (EOP) was evaluated at the end of the system. In order to correctly evaluate the penalty, the chromatic dispersion not compensated for by the OPC device due to the added length of compensating fiber was supposed to be separately compensated at the receiver. The result of the simulation is reported in FIG. 6, that shows the EOP versus the added length of dispersion compensating fiber $L_{comp}$. As it can be seen, with no added piece of dispersion compensating fiber ($L_{comp}=0$), a penalty of about 1 dB is found. With a length around 20 km of dispersion compensating fiber, penalty levels lower than 0.4 dB may be found, that is, more than 0.5 dB better than the previous case. Such length of dispersion compensating fiber corresponds to the compensation of the accumulated dispersion in 80 km of the transmission fiber (1600 ps²), that is, approximately ($L_{amp}-L_{eff}$). The use of a dispersion compensating fiber having a dispersion coefficient higher than the dispersion coefficient of the transmission fiber (in absolute value) advantageously allows to add a piece of fiber having a lower length with respect to ($L_{amp}-L_{eff}$), so that the additional attenuation introduced by the compensating fiber may be very low. In order to keep low such additional attenuation, the dispersion coefficient of the dispersion compensating fiber may be preferably three times or more higher than the dispersion coefficient of the transmission fibers, in absolute value, at the signal wavelength.

According to the Applicant, the reduction of the impact of nonlinearity shown by the above simulation may depend from the fact that a substantially symmetric disposition of the high power regions with respect to the accumulated dispersion is obtained when adding the compensator according to what stated above.

FIG. 7a and FIG. 7b schematically show plots of the optical power of an optical signal which can be obtained by propagating the same along an optical line comprising four spans of optical fiber and four amplifiers, versus the dispersion accumulated by the same optical signal. In both figures, it is supposed that an OPC device is placed before the third amplifier. In FIG. 7a, it is supposed that no additional compensator is present upstream from the OPC device, whereas in FIG. 7b it is supposed that an additional compensator is present between the end of the second span and the OPC device. The compensator compensates for the accumulated dispersion in a portion of span having a length ($L_{apm}-L_{eff}$). In both figures, high power regions having a length $L_{eff}$ are highlighted.

Considering FIG. 7a first, at the input of the system the dispersion accumulated by an optical signal is zero (or at a predetermined value if pre-chirp is used) and the first amplifier (AMP#1) sets the optical power of the optical signal to a predetermined high level. During travel on the first span the signal accumulates an amount of dispersion (Dacc SP #1), in dependence of the dispersion coefficient of the fiber used, while at the same time the optical power diminishes due to fiber attenuation. At the end of the first span the optical signal is amplified by the second amplifier (AMP #2), that substantially brings the optical power up to the same level set by AMP #1. During travel on the second span, the signal continues to accumulate dispersion (Dacc SP #2), while the power diminishes, up to the OPC device. The OPC device performs optical phase conjugation, so that the accumulated dispersion at the end of the second span is folded on the opposite side of the graph, substantially at a symmetric position. At the output of the OPC device, the phase conjugated optical signal is amplified by the third amplifier (AMP #3), that substantially brings the optical power up to the same level set by AMP #1 and/or AMP #2. During travel on the third span, the phase conjugated signal reduces its accumulated dispersion (Dacc SP #3), in absolute value, while the power diminishes. Then the phase conjugated optical signal is amplified by the fourth amplifier (AMP #4) and transmitted to the fourth span, where it reduces its accumulated dispersion down to substantially zero at the end of the system. As it can be seen in FIG. 7a, the highlighted high power regions are not symmetric with respect to the zero value of accumulated dispersion.

In FIG. 7b, the high-power regions upstream and downstream from the OPC device have been staggered for better clarity. In the case shown in FIG. 7b, in the first two spans the system behaves in the same way as for the case shown in FIG. 7a. However, this time, at the end of the second span a compensator (COMP) brings the accumulated dispersion at the same level that the optical signal had after traveling the first portion of the second span having a length approximately equal to $L_{eff}$. In other words, the compensator added at the end of the second span compensates for the accumulated dispersion in the linear portion of the second span, having a length ($L_{amp}-L_{eff}$). Then the OPC device performs phase conjugation on the optical signal, changing the sign of accumulated dispersion close to the third amplifier (AMP #3). During travel on the third span, the phase conjugated signal reduces its accumulated dispersion (Dacc SP #3), in absolute value, while the power diminishes. Then the phase conjugated optical signal is amplified by the fourth amplifier (AMP #4) and transmitted to the fourth span, where it reduces its accumulated dispersion down to substantially zero at the end of the last high-power region. After that, the optical signal accumulates a residual dispersion up to the end of the system, in a portion of the fourth span in which the power level is low, so that the system behaves linearly. Thus, such residual accumulated dispersion may be compensated for (not shown for simplicity in FIG. 7b) by a further compensator placed at the end of the fourth span. As it can be seen in FIG. 7b, this time the high-power regions are disposed substantially symmetrically with respect to the zero point of accumulated dispersion. According to the results obtained by the Applicant, this is of benefit for reducing nonlinearity, at least in a similar measure to the benefit obtained by disposing the high-power regions symmetrically in space with respect to the positioning of the OPC device.

According to a second preferred embodiment, a compensator, e.g. a length of optical fiber, having a dispersion with the same sign as the sign of the dispersion coefficient of the transmission fiber included in the fiber spans is added. In such case, the OPC device is disposed upstream from the compensator. FIG. 8 is a schematic enlargement of the portion of optical line including the OPC device 15 of the system 10 in FIG. 1. The same reference numbers of FIG. 4 are used for indicating similar components. As it can be seen, a length of additional optical fiber 16 is disposed between the OPC device 15 and an optical amplifier 13⁴ disposed along the optical line, so that it is connected to the OPC device 15 at a first end 17 and to the optical amplifier 13⁴ at a second end 18 thereof. In alternative to a length of additional optical fiber, a different type of compensator can be used, such as for example a grating. The additional optical fiber 16 is suitable for introducing an accumulated dispersion substantially equal to the dispersion accumulated in a portion of the span 14³ having a length ($L_{amp}-L_{eff}$).

FIG. 9 schematically shows the corresponding behavior of the optical power and of the chromatic dispersion of a signal traveling in the portion of optical line shown in FIG. 8. For example, it may be assumed that the sign of dispersion of the transmission fiber included in the spans of the optical line is positive at the signal wavelength, so that the sign of dispersion of compensator 16 is equally positive. The behavior of the optical power of the optical signal is shown in FIG. 9 by the continuous line. As it can be seen, the optical power increases up to a maximum level at the amplifier 13³ and then decreases due to the attenuation of the fiber included in the span 14³. After a portion of span having a length $L_{eff}$, the optical power has decreased until a level at which it may be supposed that nonlinear effects do not play a substantial role, so that the optical system behaves practically linearly. At the end of the span, that is, after a length $L_{amp}$, the signal passes through the OPC device 15 and the compensator 16, and then is re-amplified by amplifier 13⁴, so that the optical power increases abruptly to the maximum level, and so on. Advantageously, the optical power of the phase conjugated signal in output from the OPC device 15 may be kept sufficiently low, so that when the phase conjugated optical signal enters in the compensator 16 nonlinearity does not substantially arise. On the other hand, the behavior of accumulated dispersion is shown in FIG. 9 by the dashed line. As it can be seen, the accumulated dispersion grows substantially linearly along the span 14³, starting from an initial value which practically depends on the distance of the considered span from the insertion point of the signal in the optical line. If $D_f$ is the dispersion coefficient at the signal wavelength of the transmission optical fiber included in the fiber span 14³, the total accumulated dispersion in the span is $D_f L_{amp}$. Then the optical signal enters in the OPC device 15, for being subjected to phase conjugation (arrow in FIG. 9). At the output of the OPC device 15, the sign of the accumulated dispersion of the optical signal is changed, whereas its absolute value remains substantially unchanged. The compensator 16 has a length $L_{comp}$ suitable for introducing an accumulated dispersion equal to the dispersion accumulated in a portion of the fiber span 14³. More particularly, the length $L_{comp}$ is chosen so that the compensator 16 introduces an accumulated dispersion substantially equal to the dispersion accumulated in a portion of span having a length ($L_{amp}-L_{eff}$). Due to phase conjugation, the accumulated dispersion diminishes in absolute value in the compensator 16. Then, the accumulated dispersion continues its decrease, leading towards dispersion compensation at a certain point along the system, typically near the end of the optical line. Due to the added compensator 16, a residual dispersion may remain uncompensated at the end of the optical system. A suitable additional compensator may be provided at the end of the system in order to compensate such residual dispersion.

Also in this case, if an additional piece of optical fiber is used as compensator, it is preferred to use an additional fiber having a dispersion coefficient higher than the dispersion coefficient of the transmission fibers used in the spans of the system. This advantageously allows to add a piece of fiber having a lower length with respect to ($L_{amp}-L_{eff}$), so that the additional attenuation introduced by the additional fiber may be very low. In order to keep low such additional attenuation, the dispersion coefficient of the additional fiber may be preferably three times or more higher than the dispersion coefficient of the transmission fibers, at the signal wavelength.

Figure 10:
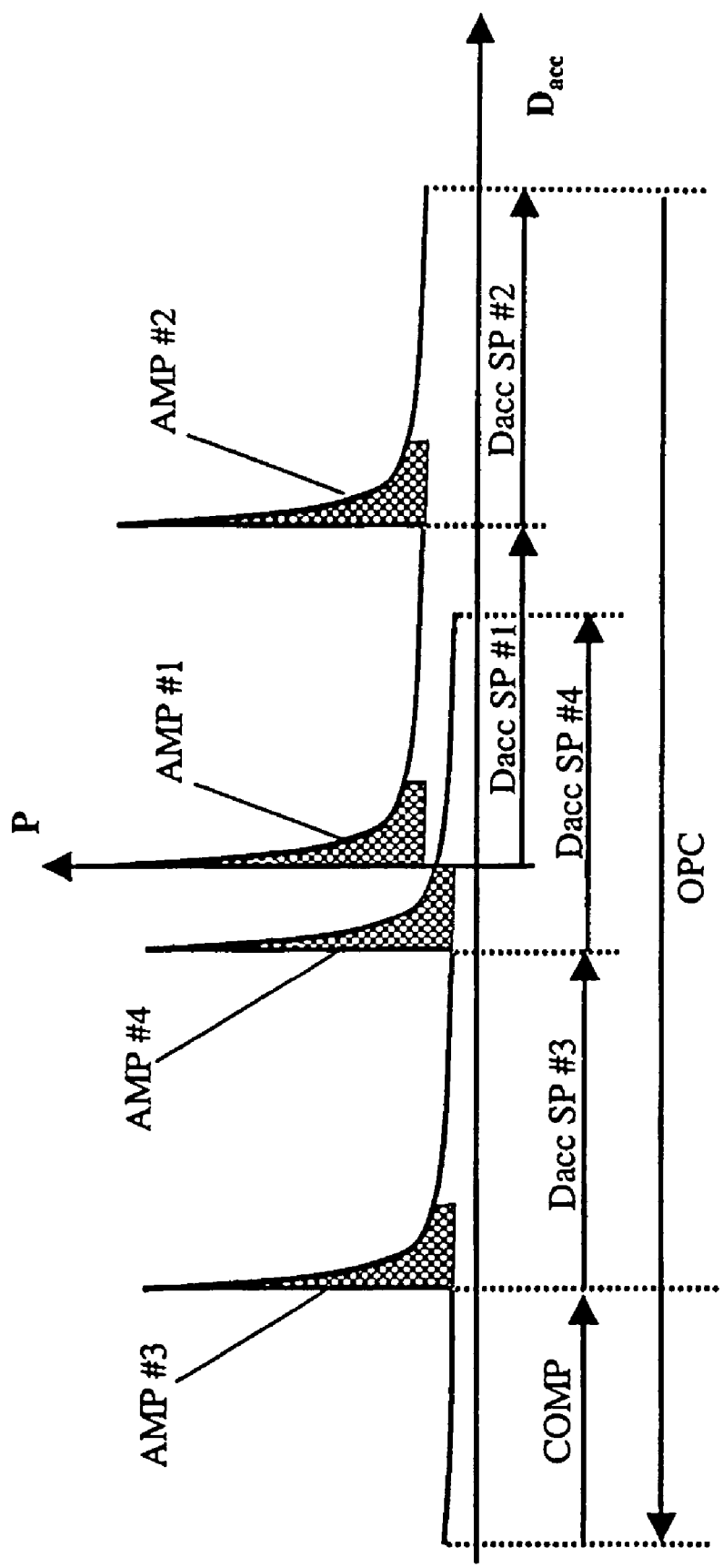
FIG. 10 schematically shows a plot of the optical power versus accumulated dispersion, for a system according to the second embodiment of the invention.

FIG. 10 shows a diagram of the optical power versus the accumulated dispersion similar to those shown in FIGS. 7a and 7b, for a system having a compensator and an OPC device arranged according to the second embodiment. In FIG. 10, the high-power regions upstream and downstream from the OPC device have been staggered for better clarity. In the case shown in FIG. 10, in the first two spans the system behaves in the same way as in the case shown in FIG. 7a. At the end of the second span, the OPC device performs optical phase conjugation, so that the accumulated dispersion is folded on the opposite side of the plot, substantially at a symmetric position. Then, before the third amplifier (AMP #3), a compensator (COMP) introduces a quantity of accumulated dispersion substantially equal to the dispersion accumulated in the linear portion of the second span, having a length ($L_{amp}-L_{eff}$), so that the phase conjugated signal reduces its accumulated dispersion, in absolute value, of the same quantity. Then the third amplifier (AMP #3) amplifies the phase conjugated signal. During travel on the third span, the phase conjugated signal still reduces its accumulated dispersion (Dacc SP #3), in absolute value, while the power diminishes. The phase conjugated optical signal is finally amplified by the fourth amplifier (AMP #4) and transmitted to the fourth span, where it reduces its accumulated dispersion down to substantially zero at the end of the last high-power region. After that, the optical signal accumulates a residual dispersion up to the end of the system, in a portion of the fourth span in which the power level is low, so that the system behaves linearly. Thus, such residual accumulated dispersion may be compensated for (not shown for simplicity in FIG. 10) by a further compensator placed at the end of the fourth span. As it can be seen in FIG. 10, the high-power regions are disposed substantially symmetrically with respect to the zero point of accumulated dispersion.

Preferably, the OPC device may be disposed in proximity of the mid-span optical amplifier. If the optical system has N spans between its input and its output, the mid-span optical amplifier is the $[N/2+1]^{th}$ (to be understood as the integer part of $N/2+1$) optical amplifier, starting the counting of the optical amplifiers from the input of the optical fiber path. This particular positioning is preferred in that it allows at the same time to reduce in a very effective manner the effects of nonlinearities and to compensate chromatic dispersion to a great extent, except for a residual chromatic dispersion that may be compensated separately, for example at the end of the optical fiber path. Further, the reduction of the effects of nonlinearities may be very effective with a positioning near the mid-span, as in this case the high-power regions will be disposed symmetrically with respect to the OPC. However, the Applicant has found that positive effects in the reduction of the impact of nonlinearity may be obtained by positioning the OPC near an amplifier disposed within a mid-span portion of the optical fiber path of $\pm L/5$, preferably $\pm L/6$, around the mid-span point of the optical fiber path, wherein L is the overall length of the optical fiber path. Anyway, it has to remembered that if the positioning of the OPC device is made away from the mid-span optical amplifier, then a substantial amount of chromatic dispersion not compensated by the OPC device needs to be compensated. This may be done once at the end of the optical fiber path, preferably with one or more compensating gratings, or more gradually along the optical fiber path with suitable compensating devices, for example included in at least some optical amplifier, provided that the symmetry in the distribution of the high power regions along the optical path of the system with respect to accumulated dispersion is preserved.

Figure 11:
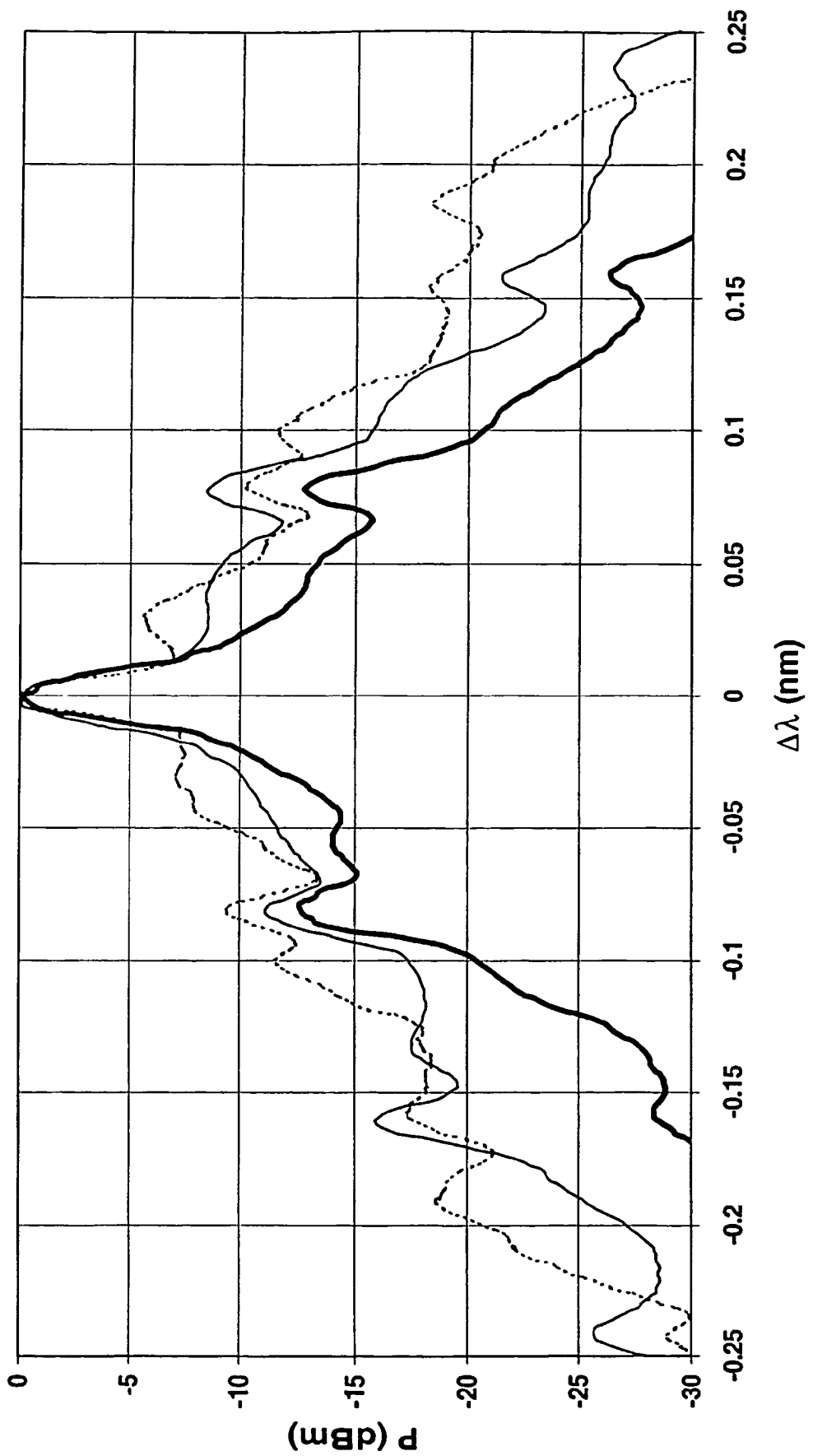
FIG. 11 shows the comparative result of experiments performed by the Applicant with a configuration using an OPC and a compensator according to FIG. 4 (continuous thick line), with a configuration using an OPC only (continuous thin line), and with a configuration with no OPC (dashed thin line)

FIG. 11 shows the result of an experiment performed by the Applicant with a configuration according to FIG. 4. A NRZ signal having a bit rate of 10 Gbit/s, an average power of 12 dBm and a central wavelength of 1552.5 nm was launched over an optical line made of four spans of FreeLight™ fiber, produced by FOS (Italy), having a group velocity dispersion of about $-5$ ps$^2$/km at 1550 nm and an attenuation of about 0.2 dB/km at 1550 nm (that is, $L_{eff} \cong 21$ km). The spans had an average length $L_{amp}$ of about 100 km (the actual lengths were between 99 km and 104 km), so that $(L_{amp}-L_{eff}) \cong 79$ km. The high average power of the pulse launched in the experimental system was chosen in order to cause strong nonlinear effects to occur, in view of the relatively short length of the overall system (about 400 km). An OPC device was disposed between the input of the third amplifier and the output end of a piece about 4.9 km long of dispersion compensating optical fiber having a group velocity dispersion of +80 ps$^2$/km, connected at the end of the second span, so as to compensate dispersion accumulated in about 78 km of FreeLight™ fiber. The OPC device was realized by use of two semiconductor optical amplifiers (SOAs) disposed in a Mach-Zehnder configuration between two polarization beam splitters, according to a polarization diversity scheme, to achieve polarization independent operation. Each of the SOA along the arms of the Mach-Zehnder was an Optospeed SOA1550MRI/X with a guide length of 1.5 mm. Optical phase conjugation was achieved in each SOA by four-wave-mixing. A pump source with a wavelength of 1550.9 nm was used to this end. The output wavelength of the phase conjugated pulse was 1549.3 nm. In FIG. 11, the thick continuous line shows the spectrum of the pulse after propagation at the end of the system. The x-axis is normalized versus the central wavelength of the received phase conjugated signal, whereas the y-axis is normalized versus the peak power of the received pulse.

The experiment was then repeated by eliminating the piece of dispersion compensating fiber, leaving only the OPC device. The thin continuous line in FIG. 11 shows the spectrum of the received pulse, normalized versus central wavelength and peak power.

The experiment was further repeated by eliminating also the OPC device. The thin dashed line in FIG. 11 shows the spectrum of the received pulse, normalized versus central wavelength (this time unchanged during propagation) and peak power.

As it can be seen, the spectrum of the pulse in the system without the OPC device is quite large, due to the onset of nonlinear effects in the optical line (mainly self-phase-modulation). The reduction of the effect of nonlinearity with the configuration having the OPC and the additional dispersion compensating fiber is clearly visible. FIG. 11 also shows a substantial reduction versus a configuration having only the OPC device.

Figure 12:
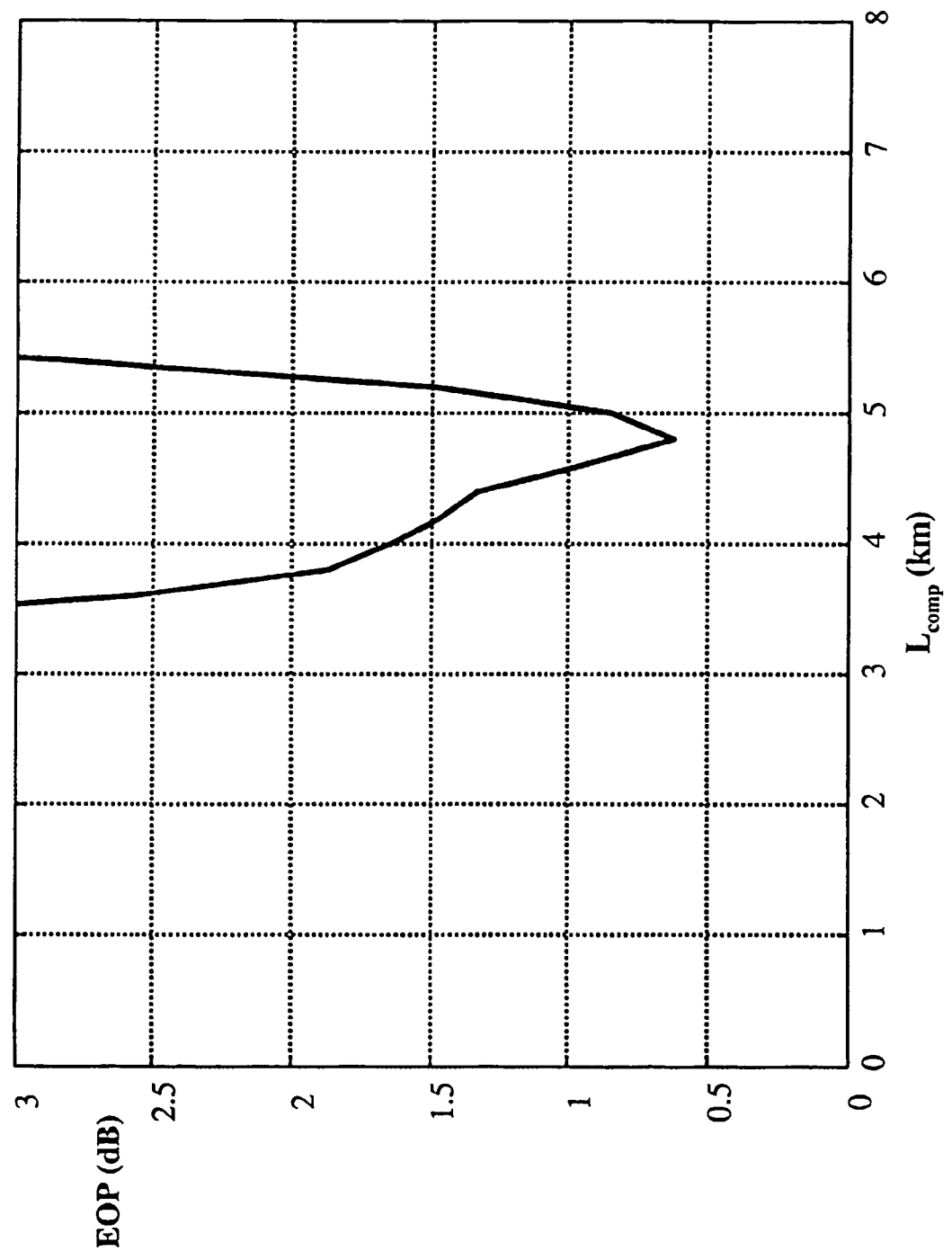
FIG. 12 shows the eye opening penalty versus the length of added compensating fiber, obtained in a simulated system corresponding to the system of the experiment of FIG. 11 but with a bit rate of 40 Gbit/s.

FIG. 12 shows the results of a fourth simulation performed by Applicant under conditions corresponding to those of the now described experiment, with the only variation that the bit rate of the NRZ signal was of 40 Gbit/s in the simulation. For the fourth simulation, different lengths of dispersion compensating fiber were introduced and the eye opening penalty (EOP) at the receiver was evaluated for each added length (compensating fiber added in steps of 200 m). The residual dispersion caused by the addition of the piece of dispersion compensating fiber was linearly compensated at the end of the system. The line in FIG. 12 shows the penalty versus the length $L_{comp}$ of added dispersion compensating fiber. As it can be seen, a minimum of penalty is found for $L_{comp}$ of about 4.9 km, showing a good matching with the results of the experiment.

Figure 13B:
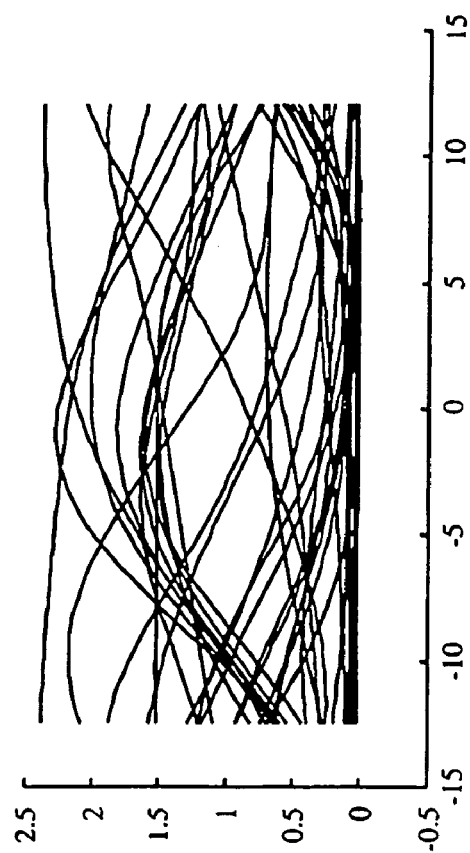
FIGS. 13a–b show two eye diagrams of the simulation of FIG. 12.
Figure 13A:
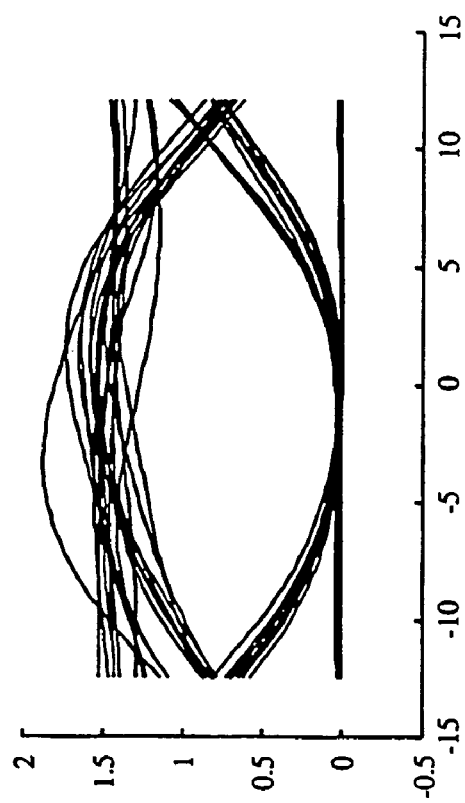

FIGS. 13a–b show the eye diagram of the pulses of the previous fourth simulation, in a system including 4.9 km of additional fiber having a dispersion of +80 ps$^2$/km and, respectively, of the pulses at the output of a system having an OPC but no additional fiber (point $L_{comp}=0$ in FIG. 12). FIG. 13a corresponds to a penalty of 0.73 dB, whereas FIG. 13b corresponds to a complete eye closure (very high penalty).

Figure 14:
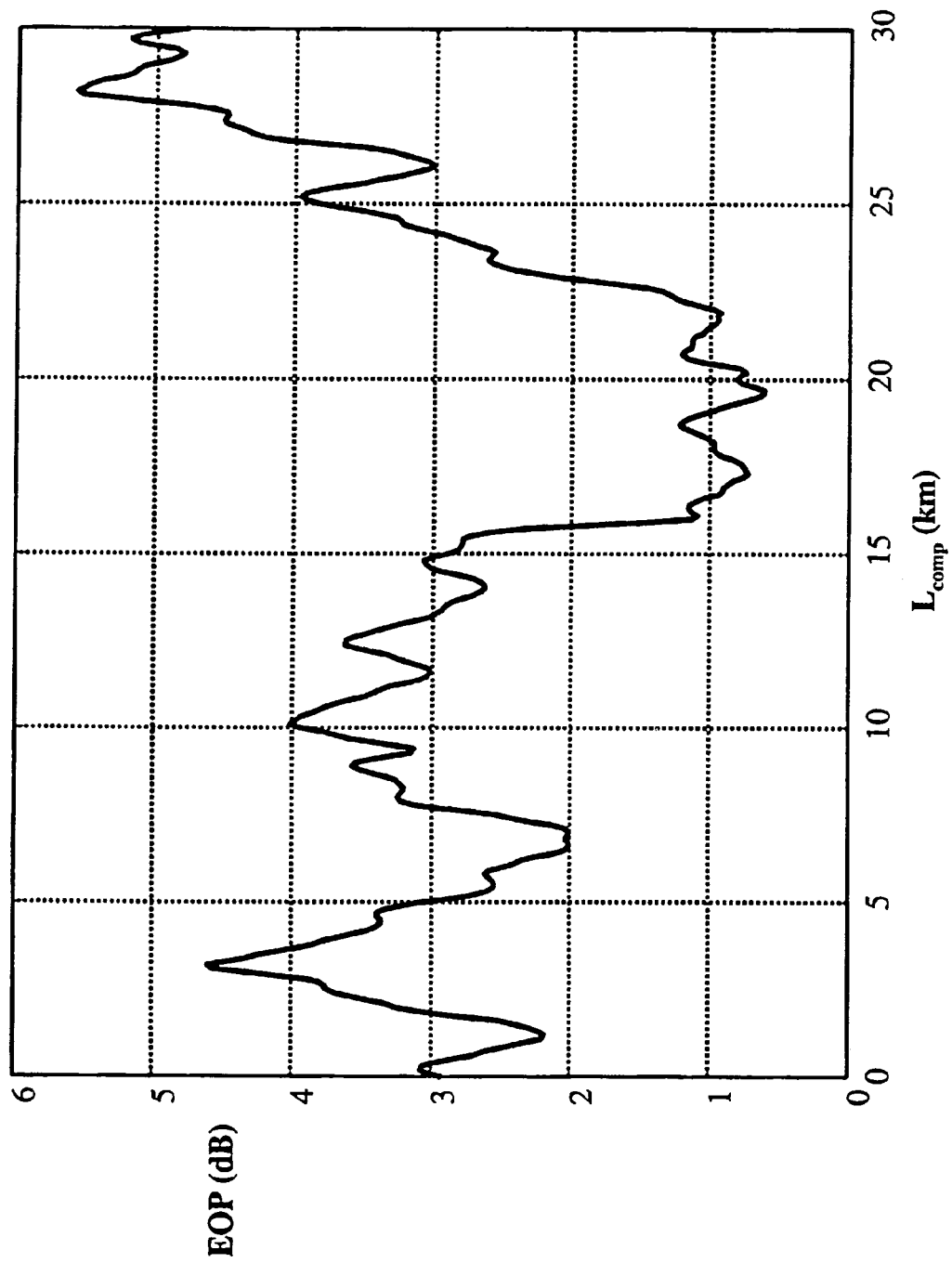
FIG. 14 shows the eye opening penalty versus the length of added compensating fiber, obtained in a simulated system of 1800 km according to the first and second embodiment of the invention.

FIG. 14 shows the results of a fifth simulation performed by the Applicant. A RZ signal, having a gaussian shape, full-width at half-maximum duration $T_{FWHM}$ of 5 ps, average power 10 dBm, modulated at 40 Gbit/s by a PRBS word having a length of 32 bit, was launched over a system having eighteen spans of fiber. The spans had a length of 100 km. The fiber had a group velocity dispersion of $-20$ ps$^2$/km, an attenuation of 0.2.dB/km and a nonlinear coefficient of 1.3 1/(W·km). At the beginning of each span lumped (EDFA) amplification was introduced. An ideal OPC device, performing only phase conjugation, was introduced at the end of the ninth span, before the tenth amplifier. A piece of dispersion compensating fiber having a group velocity dispersion of +80 ps$^2$/km was added between the input of the OPC device and the output end of the ninth span, according to the configuration of FIG. 4. A nonlinear coefficient of zero was set for the dispersion compensating fiber, as such fiber is placed in a substantially linear region, so that the simulation result would not change to a significant extent even if the nonlinearity of the dispersion compensating fiber was considered. For the simulation, different lengths of dispersion compensating fiber were introduced and the eye opening penalty (EOP) at the receiver was evaluated for each added length (compensating fiber added in steps of 200 m). The residual dispersion caused by the addition of the piece of dispersion compensating fiber was linearly compensated at the end of a system. The line in FIG. 14 shows the penalty versus the length $L_{comp}$ of added dispersion compensating fiber. As it can be seen, a minimum of penalty in a region around 20 km, between about 16 km and 22 km is found. Such minimum may reach values of penalty lower than the penalty of a system not including the additional fiber (see point $L_{comp}=0$ in FIG. 14) by more than 2 dB.

Figure 15B:
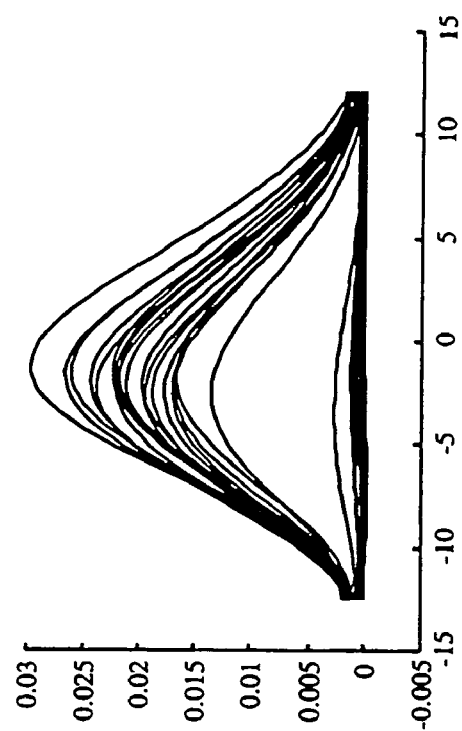
FIGS. 15a–b show two eye diagrams of the simulation of FIG. 14.
Figure 15A:
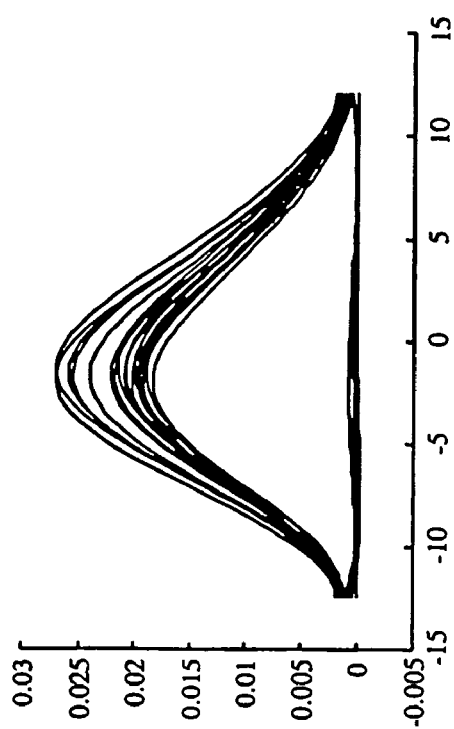

FIGS. 15a–b show the eye diagrams of the pulses of the previous fifth simulation, respectively at the output of a system including 20 km of additional fiber having opposite sign of dispersion with respect to the fiber used in the spans (FIG. 15a) and of a system (FIG. 15b) having an OPC but no additional fiber (point $L_{comp}=0$ in FIG. 14). FIG. 15a corresponds to a penalty of 0.80 dB, whereas FIG. 15b corresponds to a penalty of 2.92 dB.

In a sixth simulation, the added compensating fiber had a group velocity dispersion of −80 ps$^2$/km. The OPC device was introduced at the output end of the ninth span and the additional fiber was connected between the output of the OPC device and the input of the tenth amplifier, according to the configuration of FIG. 8. The rest of the parameters considered for this sixth simulation were the same of the fifth simulation. This sixth simulation was performed in a similar way to the previous one. The result is identical to the line resulting in FIG. 14 from the previous simulation.

Figure 16:
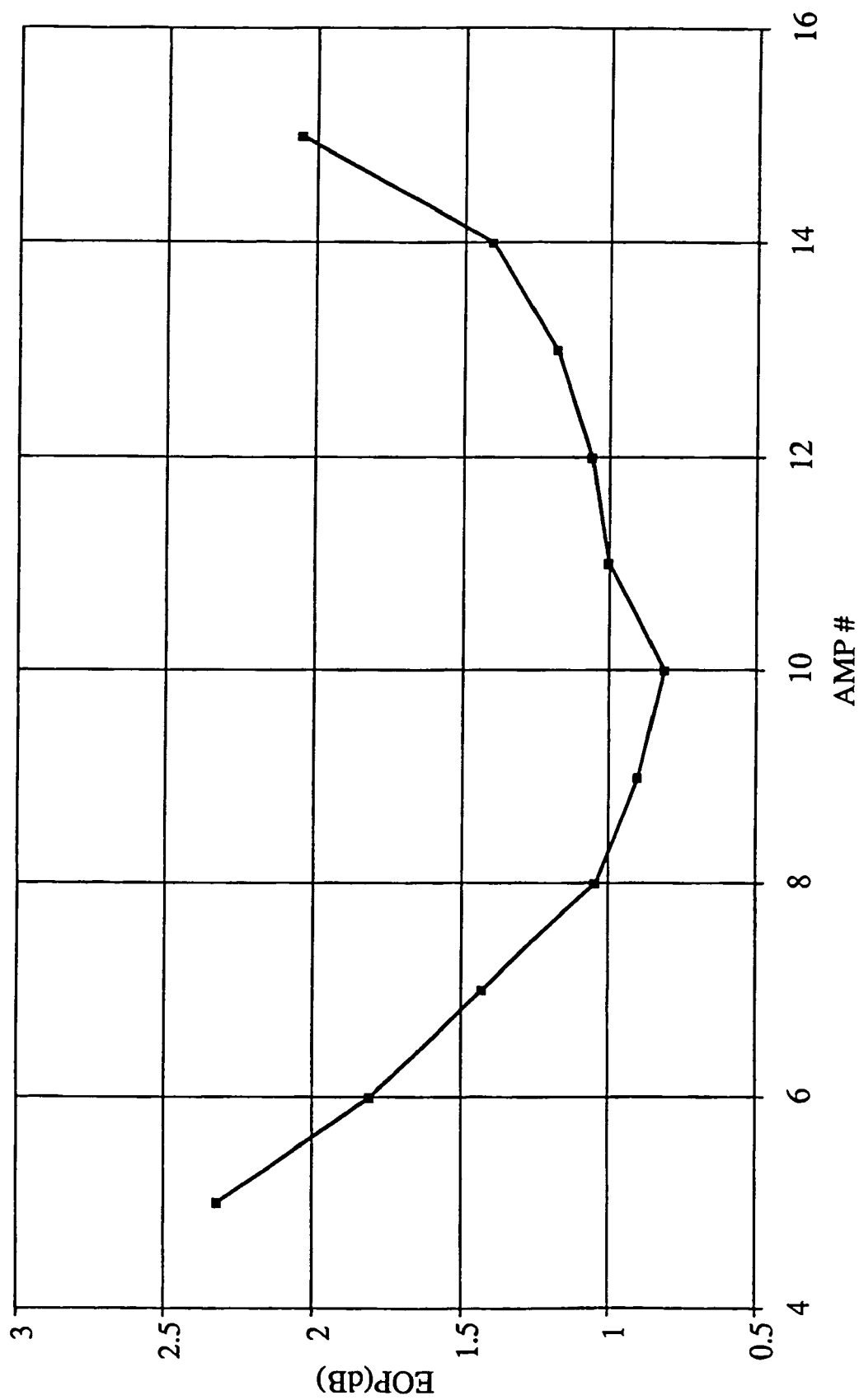
FIG. 16 shows the penalty versus the amplifier number for a system of 1800 km having an OPC and 20 km of an additional fiber according to the first embodiment of the invention.

In a seventh simulation, carried out for a system according to the fifth simulation, the OPC device and the additional fiber were put upstream from amplifiers different from the tenth one (that is, different from the mid-span amplifier). The length of the additional fiber was 20 km. The residual dispersion was supposed to be compensated once at the end of the system. FIG. 16 shows the result of the simulation, as a plot of EOP versus the amplifier number (AMP #). As it can be seen, a minimum of penalty may be found for the mid-span amplifier (AMP #10): however, the penalty does not increase a lot in a region between the eighth and the fourteenth amplifier (that is, between 700 km and 1300 km). Thus, the system may tolerate a displacement of the OPC device with respect to the mid-span amplifier, if the positioning of the OPC at the mid-span amplifier is not convenient for practical installation reasons.

The system according to the invention has been explained with reference to an optical fiber path included between a transmitting station and a receiving station. This has not to be considered as limiting the invention, as an optical line including an optical fiber path according to what stated above may be disposed in a more complex network between any two nodes the network itself, for example two nodes of an optical network not having transmitting and/or receiving function, but only routing function.

The system or the optical line according to the invention may be implemented ex-novo, by connecting at least the various components described with reference to FIG. 1 and FIG. 4 or FIG. 8 and preferably providing that the compensator 16 and the OPC device 15 be included in the same amplification site of the associated amplifier. Less preferably, the compensator 16 and the OPC device 15 may be included in a separated site.

The system or the optical line according to the invention may further be an upgrade of an already installed system. In such case, it may be possible to provide the OPC device 15 and the compensator 16 arranged according to the invention, so as to include both OPC device 15 and compensator 16 in the same amplification site of the associated amplifier. Less preferably, the OPC device 15 and the compensator 16 may be included in a separated site.

The invention claimed is:

1. An optical system comprising:
an optical fiber path suitable for propagating an optical signal at least in a first direction;
a plurality M of optical amplifiers disposed along said optical fiber path so as to divide said optical fiber path in N spans of optical fiber, said spans of optical fiber having substantially a length $L_{amp}$ and comprising at least one transmission optical fiber having an effective length $L_{eff}$; and
an optical phase conjugation device associated to an amplifier of said plurality of amplifiers,
said optical phase conjugation device being disposed in combination with a dispersion compensator, said compensator being disposed upstream from said amplifier associated to the optical phase conjugated device, said compensator being adapted for introducing an accumulated dispersion such as to substantially compensate a dispersion accumulated in a portion having a length $(L_{amp}-L_{eff})$ of a span immediately upstream from said amplifier associated to said optical phase conjugation device.

2. The optical system according to claim 1, wherein said dispersion compensator has a sign of dispersion opposite to a sign of dispersion of said span immediately upstream from said amplifier at a wavelength of said optical signal, and said optical phase conjugation device is disposed downstream from said dispersion compensator.

3. The optical system according to claim 1, wherein said dispersion compensator has a sign of dispersion equal to a sign of dispersion of said span immediately upstream from said amplifier at a wavelength of said optical signal, and said optical phase conjugation device is disposed upstream from said dispersion compensator.

4. The optical system according to claim 1, wherein said dispersion compensator includes a length of optical fiber.

5. The optical system according to claim 4, wherein said length of optical fiber has an absolute value of dispersion coefficient higher than or equal to three times the dispersion coefficient of said transmission optical fiber at a wavelength of said optical signal.

6. The optical system according to claim 1, wherein said dispersion compensator further comprises a chirped fiber grating.

7. The optical system according to claim 2, wherein said dispersion compensator further comprises a chirped fiber grating.

8. The optical system according to claim 3, wherein said dispersion compensator further comprises a chirped fiber grating.

9. The optical system according to claim 1, wherein said optical amplifiers comprise erbium-doped fiber amplifiers.

10. The optical system according to claim 1, further comprising a transmitting station and a receiving station, said transmitting station being connected at an input end and said receiving station being connected to an output end of said optical fiber path.

11. A method for assembling an optical system comprising the steps of:
   providing a plurality M of optical amplifiers;
   connecting said plurality of optical amplifiers by N spans of optical fiber so as to form an optical fiber path, said spans of optical fiber having substantially a length $L_{amp}$ and comprising at least one transmission optical fiber having an effective length $L_{eff}$; and
   associating a phase conjugation device to an amplifier along said optical fiber path; said step of associating comprising:
      disposing a dispersion compensator upstream from said amplifier associated to the optical phase conjugated device, and
      disposing said phase conjugation device in combination with said dispersion compensator, said compensator being adapted for introducing an accumulated dispersion such as to substantially compensate a dispersion accumulated in a portion having a length $(L_{amp}-L_{eff})$ of a span immediately upstream from said amplifier associated to said optical phase conjugation device.

12. A method of operating of an optical transmission system comprising an optical fiber path comprising at least one transmission optical fiber having an effective length $L_{eff}$ and a plurality of optical amplifiers disposed along said optical fiber path so as to divide said optical fiber path in N spans of optical fiber having substantially a length $L_{amp}$, comprising:
   inserting an optical signal at an input end of said optical fiber path;
   amplifying said optical signal along said fiber spans by said plurality of optical amplifiers;
   accumulating a dispersion of said optical signal along said optical fiber path;
   phase-conjugating said optical signal near a first amplifier of said plurality of optical amplifiers so that said optical signal diminishes its accumulated dispersion, in absolute value, after said step of phase-conjugating; and
   passing said optical signal, before said first amplifier, through a compensator, said compensator introducing an accumulated dispersion such as to substantially compensate a dispersion accumulated in a portion having a length $(L_{amp}-L_{eff})$ of a span immediately upstream from said first amplifier.

13. A method of upgrading an optical transmission system comprising an optical fiber path, the optical fiber path including at least one transmission optical fiber having an effective length $L_{eff}$ and a plurality of optical amplifiers disposed along said optical fiber path so as to divide said optical fiber path in N spans of optical fiber having substantially a length $L_{amp}$, comprising:
   disposing a phase conjugation device in association with one of said plurality of optical amplifiers in combination with a dispersion compensator disposed upstream from said one amplifier, said compensator being adapted for introducing an accumulated dispersion such as to substantially compensate a dispersion accumulated in a portion having a length $(L_{amp}-L_{eff})$ of a span immediately upstream from said one amplifier associated to said optical phase conjugation device.

* * * * *